(12) United States Patent
Xu et al.

(10) Patent No.: US 12,476,455 B2
(45) Date of Patent: Nov. 18, 2025

(54) BIPOLAR PHOTOVOLTAIC SYSTEM, POWER SUPPLY SYSTEM, AND REDUNDANCY PROTECTION METHOD

(71) Applicant: Huawei Digital Power Technologies Co., Ltd., Shenzhen (CN)

(72) Inventors: Zhiwu Xu, Shenzhen (CN); Hongmiao Fang, Shanghai (CN); Yanzhong Zhang, Shenzhen (CN); Changshuan Sun, Shanghai (CN); Tiansan Lin, Shenzhen (CN)

(73) Assignee: Huawei Digital Power Technologies Co., Ltd., Shenzhen (CN)

(*) Notice: Subject to any disclaimer, the term of this patent is extended or adjusted under 35 U.S.C. 154(b) by 263 days.

(21) Appl. No.: 18/324,403

(22) Filed: May 26, 2023

(65) Prior Publication Data
US 2023/0299579 A1     Sep. 21, 2023

Related U.S. Application Data

(63) Continuation of application No. PCT/CN2020/132570, filed on Nov. 30, 2020.

(51) Int. Cl.
*H02J 1/08* (2006.01)
*H02H 3/05* (2006.01)
*H02H 3/20* (2006.01)

(52) U.S. Cl.
CPC .............. *H02J 1/082* (2020.01); *H02H 3/05* (2013.01); *H02H 3/202* (2013.01); *H02J 2300/24* (2020.01)

(58) Field of Classification Search
CPC ........ H02J 1/082; H02J 2300/24; H02H 3/05; H02H 3/202
See application file for complete search history.

(56) References Cited

U.S. PATENT DOCUMENTS

| 9,755,454 B1 | 9/2017 | Reynov et al. |
| 10,044,190 B2 | 8/2018 | Urry et al. |

(Continued)

FOREIGN PATENT DOCUMENTS

| CN | 104218609 A | 12/2014 |
| CN | 106130058 A | 11/2016 |

(Continued)

OTHER PUBLICATIONS

Translation of CN 206099366U by Clarivate Analytics Mar. 2025, 10 pages.*

(Continued)

*Primary Examiner* — Harry R Behm
(74) *Attorney, Agent, or Firm* — Maier & Maier, PLLC

(57) ABSTRACT

A power supply system including three output ends of a power converter respectively connected to a first end of a positive/negative direct current bus and a first end of a neutral bus; two input ends of a first inverter respectively connected to a second end of the positive direct current bus and a second end of the neutral bus; two input ends of a second inverter respectively connected to a second end of the neutral bus and a second end of the negative direct current bus; a controller outputs an overvoltage alarm signal when at least one of the following conditions is met: a to-ground voltage of the positive/negative direct current bus or a to-ground voltage of the neutral bus is greater than or equal to the preset threshold.

15 Claims, 10 Drawing Sheets

(56) References Cited

U.S. PATENT DOCUMENTS

2013/0207705 A1    8/2013   Prabhuk et al.
2018/0276097 A1*   9/2018   Glenny ............... G06F 11/3024

FOREIGN PATENT DOCUMENTS

| CN | 206099366 U | * | 4/2017 |
| CN | 107147145 A | | 9/2017 |
| CN | 109818331 A | * | 5/2019 |
| CN | 110994540 A | * | 4/2020 |
| CN | 111969562 A | | 11/2020 |

OTHER PUBLICATIONS

Translation of CN 110994540A by Clarivate Analytics, Mar. 2025, 15 pages.*
Translation of CN 10981331A by Clarivate Analytics, Mar. 2025, 13 pages.*
Zorig et al., "Neutral Point Voltage Balancing Control and Quality Power Improvement of PV System Based on Dual Three-Level Stage Conversion", 6th International Conference on Control Engineering & Information Technology (CEIT), IEEE, Oct. 25-27, 2018, pp. 1-6.

* cited by examiner

BIPOLAR PHOTOVOLTAIC SYSTEM, POWER SUPPLY SYSTEM, AND REDUNDANCY PROTECTION METHOD

CROSS-REFERENCE TO RELATED APPLICATIONS

This application is a continuation of International Application No. PCT/CN2020/132570, filed on Nov. 30, 2020, the disclosure of which is hereby incorporated by reference in its entirety.

TECHNICAL FIELD

The embodiments relate to the field of photovoltaic power generation technologies, a bipolar photovoltaic system, a power supply system, and a redundancy protection method.

BACKGROUND

Currently, photovoltaic power generation is gaining more attention, and a voltage level is getting higher. During conventional photovoltaic power generation, a photovoltaic array outputs a direct current, which is converted into an alternating current by an inverter and then connected to a power grid or provided to a load.

A direct current bus in a conventional photovoltaic system includes a positive direct current bus and a negative direct current bus, that is, a positive input end of the inverter is connected to the positive direct current bus, and a negative input end of the inverter is connected to the negative direct current bus. A voltage between the positive direct current bus and the negative direct current bus is used as an input voltage of the inverter.

To meet safety regulations, the input voltage of the inverter, namely, a voltage on the direct current side, has to be less than a value meeting the safety regulations. Otherwise, personal safety is endangered and equipment is damaged. Especially, a corresponding voltage withstanding requirement is imposed on each power device inside the inverter. If a voltage is greater than or equal to a voltage that could be withstood, the device may be broken down and damaged. If a voltage level of the photovoltaic system increases, a new challenge is posed for voltage withstanding of the power device. Consequently, selection of the power device is more difficult.

SUMMARY

The embodiments may provide a bipolar photovoltaic system, a power supply system, and a redundancy protection method, to implement fault detection for a bipolar power supply and provide timely redundancy protection when a fault occurs.

An embodiment may provide a bipolar photovoltaic system that is different from a conventional unipolar photovoltaic system. The bipolar photovoltaic system includes three direct current buses, which are respectively a positive direct current bus, a neutral bus, and a negative direct current bus. An input end of a power converter is connected to a photovoltaic array; and a first output end, a second output end, and a third output end of the power converter are respectively connected to a first end of the positive direct current bus, a first end of the neutral bus, and a first end of the negative direct current bus. A first input end and a second input end of a first inverter are respectively connected to a second end of the positive direct current bus and a second end of the neutral bus; and a first input end and a second input end of a second inverter are respectively connected to the second end of the neutral bus and a second end of the negative direct current bus.

To fully and reliably protect the bipolar photovoltaic system, in this embodiment, at least two controllers may be disposed to perform overvoltage detection. A quantity of controllers is not limited to two, and more controllers may be disposed. For example, a first controller and a second controller are included. The first controller outputs a first overvoltage alarm signal when at least one of the following conditions is met; the second controller outputs a second overvoltage alarm signal when at least one of the following conditions is met; and the at least one condition includes: a to-ground voltage of the positive direct current bus is greater than or equal to a preset threshold, a to-ground voltage of the negative direct current bus is greater than or equal to the preset threshold, or a to-ground voltage of the neutral bus is greater than or equal to the preset threshold. In other words, provided that a to-ground voltage of one direct current bus is greater than or equal to the preset threshold, both of the two controllers output the corresponding overvoltage alarm signals. Even one of the controllers is faulty, overvoltage determining is not affected. Therefore, overvoltage protection can be reliably performed. The voltage is lowered below the preset threshold, that is, the voltage is lowered to a value meeting safety regulations to ensure personal safety and equipment safety. The first controller and the second controller are equally important when protecting the bipolar photovoltaic system. In this embodiment, the two controllers perform dual overvoltage monitoring on the photovoltaic system, thereby implementing redundancy protection.

In a possible implementation, in addition to separately detecting the to-ground voltage of each of the three direct current buses, the two controllers each further monitor a heartbeat signal of the other side, and output a heartbeat alarm signal when detecting that the other side is abnormal. The first controller outputs a first heartbeat alarm signal when the second controller is abnormal, and the second controller outputs a second heartbeat alarm signal when the first controller is abnormal.

In a possible implementation, the first controller outputs the first heartbeat alarm signal when receiving no heartbeat signal sent by the second controller, and the second controller outputs the second heartbeat alarm signal when receiving no heartbeat signal sent by the first controller. In actual application, when the first controller is normal, the first controller sends a heartbeat signal in a form of a pulse signal to the second controller. Similarly, the second controller sends a heartbeat signal in a form of a pulse signal to the first controller. Once no heartbeat signal sent by the other controller is received, a corresponding heartbeat alarm signal is output.

In a possible implementation, to implement more comprehensive and reliable protection, when the to-ground voltage of any direct current bus is excessive, or when any controller is abnormal, a driving pulse signal of the power converter is blocked, so that all power devices, that is, switching transistors, in the power converter are disabled from switching. The solution can be implemented by using a logic circuit, which is connected to the first controller and the second controller. The logic circuit receives at least one of the following alarm signals to block the driving pulse signal sent to the power converter. The at least one alarm signal includes a first overvoltage alarm signal, a second overvoltage alarm signal, the first heartbeat alarm signal, or the second heartbeat alarm signal. In this embodiment, a logical operation form of the logic circuit is not limited. For example, the logical operation form may be a logical OR operation or may be a logical AND operation.

In a possible implementation, the logic circuit is a complex programmable logic device (CPLD). The CPLD may be configured to: perform a logical OR operation on the first overvoltage alarm signal, the second overvoltage alarm signal, the first heartbeat alarm signal, and the second heartbeat alarm signal; and when a result of the logical OR operation is true, block the driving pulse signal sent to the power converter. Each alarm signal corresponding to the logical OR operation is effective at a high level. If any one alarm signal is at a high level, the driving pulse signal is blocked.

In a possible implementation, the logic circuit is a complex programmable logic device CPLD. The CPLD may be configured to: perform a logical AND operation on the first overvoltage alarm signal, the second overvoltage alarm signal, the first heartbeat alarm signal, and the second heartbeat alarm signal; and block the driving pulse signal sent to the power converter when a result of the logical AND operation is false. Each alarm signal corresponding to the logical AND operation is effective at a low level. If any one alarm signal is at a low level, the driving pulse signal is blocked. The low level has a strong anti-interference capability, and therefore, a result for protection is accurate.

In a possible implementation, the first controller compares each of an absolute value of the to-ground voltage of the positive direct current bus, an absolute value of the to-ground voltage of the negative direct current bus, or an absolute value of the to-ground voltage of the neutral bus with the preset threshold; and outputs the first overvoltage alarm signal when at least one of the absolute value of the to-ground voltage of the positive direct current bus, the absolute value of the to-ground voltage of the negative direct current bus, or the absolute value of the to-ground voltage of the neutral bus is greater than or equal to the preset threshold. When performing overvoltage monitoring, the first controller may compare each of the voltages of the three direct current buses with the preset threshold, that is, perform three different comparisons; and output the first overvoltage alarm signal provided that one of three different comparison results is true.

In a possible implementation, to reduce a quantity of comparison times, a largest value of to-ground voltages of the three direct current buses may be first obtained, and the largest value is compared with the preset threshold. The first controller may be configured to: obtain a largest value of the absolute value of the to-ground voltage of the positive direct current bus, the absolute value of the to-ground voltage of the negative direct current bus, and the absolute value of the to-ground voltage of the neutral bus; and output the first overvoltage alarm signal when the largest value is greater than or equal to the preset threshold.

In a possible implementation, the second controller may be configured to: compare each of an absolute value of the to-ground voltage of the positive direct current bus, an absolute value of the to-ground voltage of the negative direct current bus, or an absolute value of the to-ground voltage of the neutral bus with the preset threshold; and output the second overvoltage alarm signal when at least one of the absolute value of the to-ground voltage of the positive direct current bus, the absolute value of the to-ground voltage of the negative direct current bus, and the absolute value of the to-ground voltage of the neutral bus is greater than or equal to the preset threshold. When performing overvoltage monitoring, the second controller may compare each of the voltages of the three direct current buses with the preset threshold, that is, perform three different comparisons; and output the second overvoltage alarm signal provided that one of three different comparison results is true.

In a possible implementation, to reduce a quantity of comparison times, a largest value of to-ground voltages of the three direct current buses may be first obtained, and the largest value is compared with the preset threshold. In other words, the second controller obtains a largest value of the absolute value of the to-ground voltage of the positive direct current bus, the absolute value of the to-ground voltage of the negative direct current bus, and the absolute value of the to-ground voltage of the neutral bus; and outputs the second overvoltage alarm signal when the largest value is greater than or equal to the preset threshold.

In a possible implementation, a voltage sampling circuit is further included. The voltage sampling circuit collects a voltage between the positive direct current bus and the neutral bus, a voltage between the negative direct current bus and the neutral bus, and a to-ground voltage of the neutral bus. Both the first controller and the second controller may be configured to: obtain the to-ground voltage of the positive direct current bus based on the voltage between the positive direct current bus and the neutral bus and the to-ground voltage of the neutral bus; and obtain the to-ground voltage of the negative direct current bus based on the voltage between the negative direct current bus and the neutral bus, and the to-ground voltage of the neutral bus.

The foregoing embodiment provides a bipolar photovoltaic system including three direct current buses. It should be understood that the bipolar power supply may be applied not only to the field of photovoltaic power generation, but also to the field of wind power generation and energy storage power supply. An embodiment may further provide a power supply system, including: a first inverter, a second inverter, a first controller, and a second controller. A first end of a positive direct current bus is configured to connect to a first output end of a direct current power supply, a first end of a neutral bus is configured to connect to a second output end of the direct current power supply, and a first end of a negative direct current bus is configured to connect to a third output end of the direct current power supply. A first input end of the first inverter is connected to a second end of the positive direct current bus, and a second input end of the first inverter is connected to a second end of the neutral bus. A first input end of the second inverter is connected to a second end of the neutral bus, and a second input end of the second inverter is connected to a second end of the negative direct current bus. The first controller is configured to output a first overvoltage alarm signal when at least one of the following conditions is met; the second controller is configured to output a second overvoltage alarm signal when at least one of the following conditions is met; and the at least one condition includes: a to-ground voltage of the positive direct current bus is greater than or equal to a preset threshold, a to-ground voltage of the negative direct current bus is greater than or equal to the preset threshold, or a to-ground voltage of the neutral bus is greater than or equal to the preset threshold.

In a possible implementation, the direct current power source is obtained from any one of photovoltaic power generation, wind power generation, or an energy storage battery.

In a possible implementation, the first controller is further configured to output a first heartbeat alarm signal when detecting that the second controller is abnormal; and the second controller is further configured to output a second heartbeat alarm signal when detecting that the first controller is abnormal.

In a possible implementation, the first controller may be configured to: when no heartbeat signal sent by the second controller is received, detect that the second controller is abnormal; and the second controller may be configured to: when no heartbeat signal sent by the first controller is received, detect that the first controller is abnormal.

In a possible implementation, the first controller may be configured to: obtain a largest value of an absolute value of the to-ground voltage of the positive direct current bus, an absolute value of the to-ground voltage of the negative direct current bus, and an absolute value of the to-ground voltage of the neutral bus; and output the first overvoltage alarm signal when the largest value is greater than or equal to the preset threshold; and the second controller may be configured to: obtain the largest value of the absolute value of the to-ground voltage of the positive direct current bus, the absolute value of the to-ground voltage of the negative direct current bus, and the absolute value of the to-ground voltage of the neutral bus; and output the second overvoltage alarm signal when the largest value is greater than or equal to the preset threshold.

In a possible implementation, the first controller may be configured to: compare each of an absolute value of the to-ground voltage of the positive direct current bus, an absolute value of the to-ground voltage of the negative direct current bus, or an absolute value of the to-ground voltage of the neutral bus with the preset threshold; and output the first overvoltage alarm signal when at least one of the absolute value of the to-ground voltage of the positive direct current bus, the absolute value of the to-ground voltage of the negative direct current bus, or the absolute value of the to-ground voltage of the neutral bus is greater than or equal to the preset threshold; and the second controller may be configured to: compare each of an absolute value of the to-ground voltage of the positive direct current bus, an absolute value of the to-ground voltage of the negative direct current bus, or an absolute value of the to-ground voltage of the neutral bus with the preset threshold; and output the second overvoltage alarm signal when at least one of the absolute value of the to-ground voltage of the positive direct current bus, the absolute value of the to-ground voltage of the negative direct current bus, or the absolute value of the to-ground voltage of the neutral bus is greater than or equal to the preset threshold.

In a possible implementation, a logic circuit connected to the first controller and the second controller is further included. The logic circuit is configured to block a driving pulse signal sent to the power converter when at least one of the following alarm signals is received. The at least one alarm signal includes the first overvoltage alarm signal, the second overvoltage alarm signal, the first heartbeat alarm signal, or the second heartbeat alarm signal.

An embodiment may further provide a protection method for a bipolar photovoltaic system. The bipolar photovoltaic system includes: a first input end of a first inverter is connected to a second end of a positive direct current bus, and a second input end of the first inverter is connected to a second end of a neutral bus; a first input end of a second inverter is connected to the second end of the neutral bus, and a second input end of the second inverter is connected to a second end of a negative direct current bus. The protection method includes: monitoring a first overvoltage alarm signal output by a first controller and a second overvoltage alarm signal output by a second controller; determining, based on the first overvoltage alarm signal or the second overvoltage alarm signal, whether a fault occurs in the bipolar photovoltaic system; the first controller outputs the first overvoltage alarm signal when at least one of the following conditions is met; and the second controller outputs the second overvoltage alarm signal when at least one of the following conditions is met. The at least one condition includes: a to-ground voltage of the positive direct current bus is greater than or equal to a preset threshold, a to-ground voltage of the negative direct current bus is greater than or equal to the preset threshold, or a to-ground voltage of the neutral bus is greater than or equal to the preset threshold.

In a possible implementation, the method further includes: when the first controller outputs the first heartbeat alarm signal or the second controller outputs the second heartbeat alarm signal, determining that a fault occurs in the bipolar photovoltaic system; the first controller outputs the first heartbeat alarm signal when the second controller is abnormal; and the second controller outputs the second heartbeat alarm signal when the first controller is abnormal.

In a possible implementation, the method further includes: blocking a driving pulse signal sent to the power converter when at least one of the following alarm signals is received. The at least one alarm signal includes the first overvoltage alarm signal, the second overvoltage alarm signal, the first heartbeat alarm signal, or the second heartbeat alarm signal.

In a possible implementation, that the first controller outputs the first overvoltage alarm signal when the to-ground voltage of the positive direct current bus is greater than or equal to the preset threshold, the to-ground voltage of the negative direct current bus is greater than or equal to the preset threshold, or the to-ground voltage of the neutral bus is greater than or equal to the preset threshold may include: obtaining a largest value of an absolute value of the to-ground voltage of the positive direct current bus, an absolute value of the to-ground voltage of the negative direct current bus, and an absolute value of the to-ground voltage of the neutral bus; and outputting the first overvoltage alarm signal when the largest value is greater than or equal to the preset threshold.

In a possible implementation, that the second controller outputs the second overvoltage alarm signal when the to-ground voltage of the positive direct current bus is greater than or equal to the preset threshold, the to-ground voltage of the negative direct current bus is greater than or equal to the preset threshold, or the to-ground voltage of the neutral bus is greater than or equal to the preset threshold may include: obtaining a largest value of an absolute value of the to-ground voltage of the positive direct current bus, an absolute value of the to-ground voltage of the negative direct current bus, and an absolute value of the to-ground voltage of the neutral bus; and outputting the second overvoltage alarm signal when the largest value is greater than or equal to the preset threshold.

The embodiments may have the following advantages.

The bipolar photovoltaic system includes at least two controllers: the first controller and the second controller. The first controller and the second controller simultaneously monitor the to-ground voltage of each of the three direct current buses, that is, the to-ground voltage of the positive direct current bus, the negative direct current bus, and the neutral bus. When the to-ground voltage of any direct current bus is greater than or equal to the preset threshold, the first controller and the second controller each output an overvoltage alarm signal. Redundancy control is implemented for the first controller and the second controller. If one of the controllers is faulty, overvoltage determining is not affected. In this case, the system takes corresponding measures to lower the voltage below the preset threshold, thereby ensuring security of the bipolar photovoltaic system. In other words, the voltage is lowered to a value meeting safety regulations, thereby ensuring personal safety and equipment safety. It should be noted that, the first controller and the second controller are equally important when protecting the bipolar photovoltaic system. The bipolar photovoltaic system does not increase a voltage level specified in the safety regulations, a voltage borne by the power device can be reduced, and selection of the power device is easy. However, because a total voltage of the direct current buses is a voltage obtained after a positive bus and a negative bus are connected in series, the total voltage of the direct current buses is relatively high. Therefore, power consumption on the direct current bus can be reduced, and electric energy conversion efficiency can be improved.

DETAILED DESCRIPTION OF THE EMBODIMENTS

Figure 1:
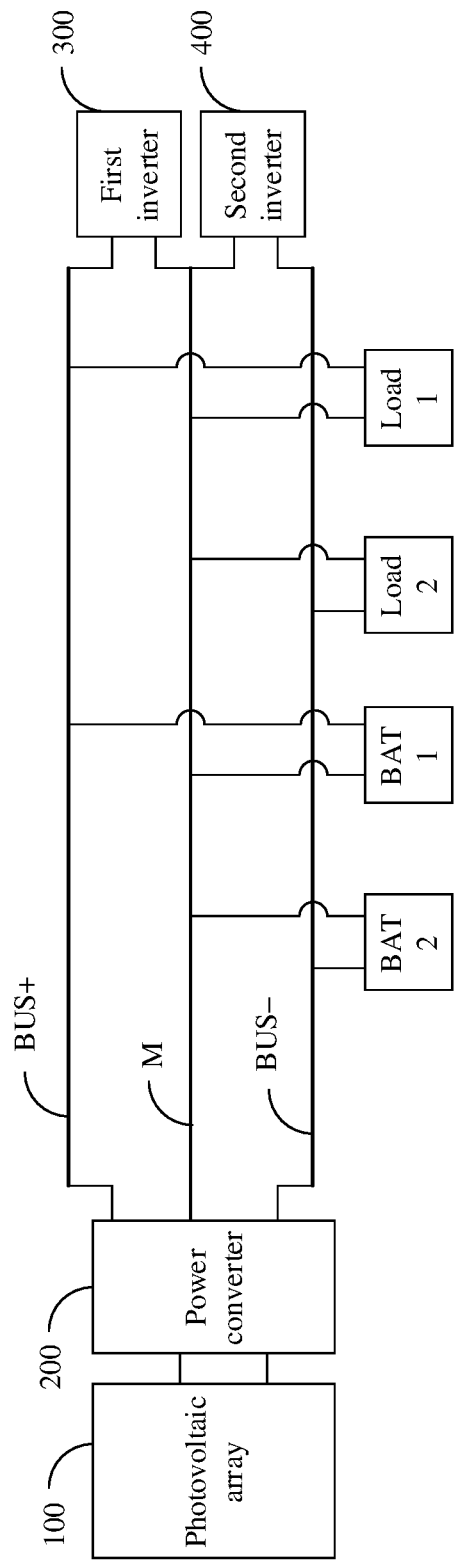
FIG. 1 is a schematic diagram of a bipolar photovoltaic system according to an embodiment.

The following terms "first" and "second" are merely intended for a purpose of description and shall not be understood as an indication or implication of relative importance or implicit indication of a quantity of indicated features. Therefore, a feature limited by "first" or "second" may explicitly or implicitly include one or more features. In the description, unless otherwise stated, "a plurality of" means two or more than two.

In addition, orientation terms such as "upper", "lower", "left", and "right" may be defined by, but are not limited to, orientations of components schematically placed in the accompanying drawings. It should be understood that these orientation terms may be relative concepts and are used for description and clarification of "relative", and may change correspondingly according to a change in a placement orientation of a component drawing in the drawings.

Unless otherwise expressly specified and limited, the term "connection" should be understood in a broad sense. For example, "connection" may be a fixed connection, a detachable connection or an integral connection; and may be a direct connection or an indirect connection by using an intermediate medium. In addition, the term "coupled" may be a manner of implementing an electrical connection for signal transmission. The "coupling" may be a direct electrical connection or may be an indirect electrical connection through an intermediate medium.

Embodiment of a Bipolar Photovoltaic System

To make persons skilled in the art better understand the embodiments, the following describes the bipolar photovoltaic system.

FIG. 1 is a schematic diagram of a bipolar photovoltaic system according to an embodiment.

The bipolar photovoltaic system provided in this embodiment differs from a conventional unipolar photovoltaic system in that the bipolar photovoltaic system includes three buses, which are a positive direct current bus BUS+, a neutral bus M, and a negative direct current bus BUS−, respectively.

An input end of the power converter 200 is configured to connect to a photovoltaic array 100, a first output end of the power converter 200 is connected to a first end of the positive direct current bus BUS+, a second output end of the power converter 200 is connected to a first end of the neutral bus M, and a third output end of the power converter 200 is connected to a first end of the negative direct current bus BUS−.

In addition, the bipolar photovoltaic system includes at least two inverters: a first inverter 300 and a second inverter 400.

A first input end of the first inverter 300 is connected to a second end of the positive direct current bus BUS+, and a second input end of the first inverter 300 is connected to a second end of the neutral bus M.

A first input end of the second inverter 400 is connected to a second end of the neutral bus M, and a second input end of the second inverter 400 is connected to a second end of the negative direct current bus BUS−.

For example, if a voltage of BUS+ is +1500 V, and a voltage of BUS− is −1500 V, a voltage level of the bipolar photovoltaic system is −1500 V or 1500 V. However, a total voltage of the direct current buses after BUS+ and BUS− are connected in series is 3000 V. Therefore, it is appropriate that the bipolar photovoltaic system provided in this embodiment is applicable to safety regulations for 1500 V, thereby lowering a voltage withstanding requirement for a power transistor in a power converter and an inverter. For example, in a case in which voltage levels of the input ends of the first inverter 300 and the second inverter 400 are both 1500 V, an input voltage of the first inverter 300 is between a voltage of the neutral bus and the voltage of the BUS+, and an input voltage of the second inverter 400 is between the voltage of the BUS− and the voltage of the neutral bus. The neutral bus M may be equipotential to ground. For example, when M has a same electric potential as the ground, the input voltage of the first inverter 300 is 0-1500 V, and the input voltage of the second inverter 400 is −1500 V to 0.

Therefore, a voltage withstanding level of the internal power transistor is lower than a level of a conventional 3000 V input voltage. The bipolar photovoltaic system provided in this embodiment can effectively reduce a voltage level borne by a power device without reducing the total bus voltage, thereby facilitating selection of the power device.

A load or an energy storage battery may be mounted between BUS+ and M or between BUS− and M. As shown in FIG. 1, an energy storage battery BAT 1 is mounted between BUS+ and M, an energy storage battery BAT 2 is mounted between BUS− and M, a load 1 is mounted between BUS+ and M, and a load 2 is mounted between BUS− and M.

Figure 2:
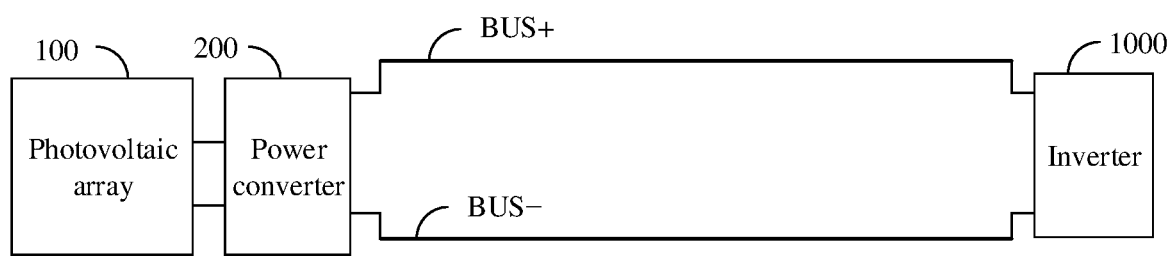
FIG. 2 is a schematic diagram of a bipolar system applied to wind power generation according to an embodiment.

To make persons skilled in the art better understand advantages of the bipolar photovoltaic system provided in embodiments, FIG. 2 is provided. FIG. 2 is a schematic diagram of a conventional unipolar photovoltaic system.

A power converter 200 includes two output ends, where a first output end of the power converter 200 is connected to a positive direct current bus BUS+, and a second output end of the power converter 200 is connected to a negative direct current bus BUS−. Similarly, an inverter 1000 includes two input ends, where a first input end of the inverter 1000 is connected to the BUS+, and a second input end of the inverter 1000 is connected to the BUS−. An input end of the power converter 200 is connected to a photovoltaic array 100.

It can be found by comparing FIG. 1 and FIG. 2 that, the unipolar photovoltaic system shown in FIG. 2 includes two direct current buses, which are BUS+ and BUS− respectively. If a total voltage of the direct current buses is still 3000 V, a voltage level connected to the input end of the inverter 1000 is 3000 V. In other words, a voltage withstood by a power transistor in the inverter 1000 is twice as high as a voltage withstood by a power transistor in a single inverter shown in FIG. 1. Therefore, the bipolar photovoltaic system shown in FIG. 1 can reduce a voltage borne by a power device, facilitating selection of the device.

During actual operation, a distance between the power converter and a post-stage inverter may be relatively long. Therefore, a loss on a power cable corresponding to the direct current bus is relatively large. Therefore, the loss needs to be maximally reduced to improve power generation efficiency. In the case in FIG. 1 in which a corresponding total voltage of direct current buses is 3000 V, a higher voltage indicates a smaller corresponding current, and further, a loss on the direct current bus can be reduced.

To meet safety regulations, none of a to-ground voltage of BUS+, a to-ground voltage of BUS−, and a to-ground voltage of M can be greater than or equal to a preset threshold. Therefore, each voltage needs to be closely monitored to ensure personal safety and equipment safety.

In the bipolar photovoltaic system provided in embodiments, a redundancy protection mechanism is set to ensure safe and reliable operation. For example, two controllers are disposed to monitor the to-ground voltage of BUS+, the to-ground voltage of BUS−, and the to-ground voltage of M, so that when one of the controllers is faulty, the other controller can reliably give an alarm. The following describes a redundancy protection solution provided in embodiments.

Figure 3:
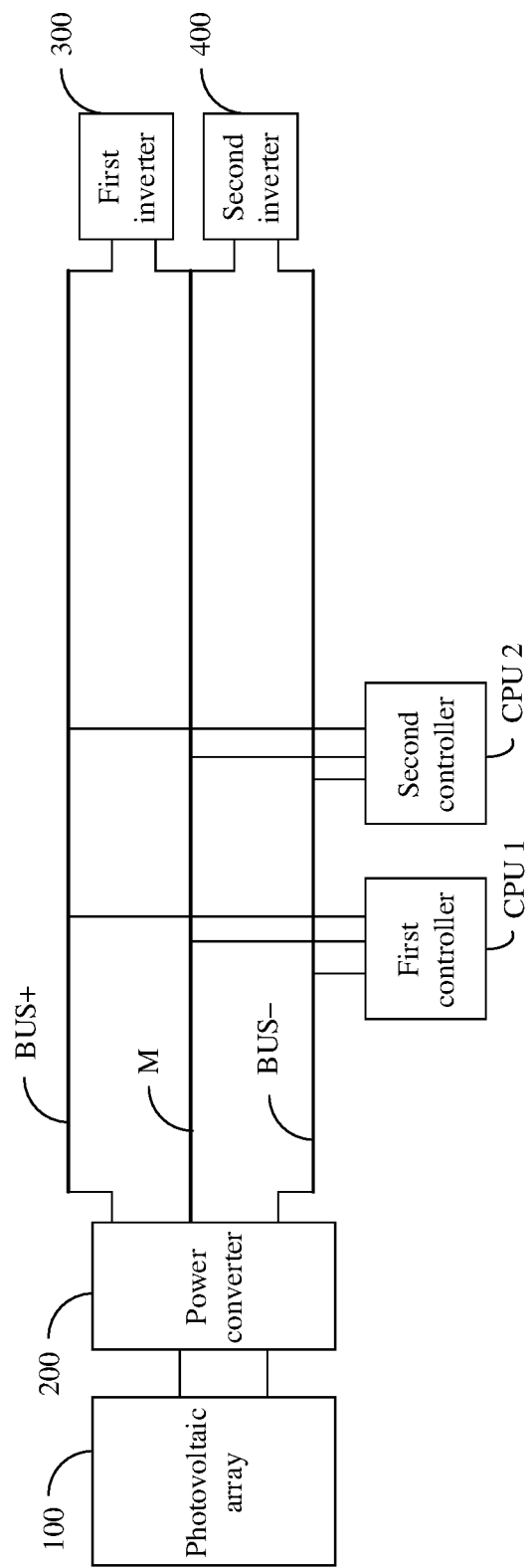
FIG. 3 is a schematic diagram of a bipolar system applied to energy storage battery according to an embodiment.

FIG. 3 is a schematic diagram of another bipolar photovoltaic system according to an embodiment.

The photovoltaic array 100, the power converter 200, the first inverter 300, and the second inverter 400 in this embodiment are connected in a same manner as that in FIG. 1, and details are not described herein again.

In addition to the power converter 200, the first inverter 300, and the second inverter 400, the bipolar photovoltaic system provided in this embodiment further includes a first controller CPU1 and a second controller CPU2.

The first controller CPU 1 is configured to output a first overvoltage alarm signal when at least one of the following conditions is met;
the second controller CPU 2 is configured to output a second overvoltage alarm signal when at least one of the following conditions is met; and
the at least one condition includes: a to-ground voltage of a positive direct current bus BUS+ is greater than or equal to a preset threshold, a to-ground voltage of a negative direct current bus BUS− is greater than or equal to the preset threshold, or a to-ground voltage of a neutral bus M is greater than or equal to the preset threshold. In this embodiment, a value range of the preset threshold may not be limited and may be set according to an actual requirement. For example, the preset threshold may be set to 110% of a voltage level. For example, for a system with a voltage level of 1500 V, the preset threshold may be set to 1650 V. In other words, when the to-ground voltage of BUS+ is greater than or equal to 1650 V, the first overvoltage alarm signal is output, indicating that the to-ground voltage of BUS+ is excessively high and an overvoltage fault occurs.

It should be noted that, outputting the first overvoltage alarm signal by the first controller CPU 1 means outputting an effective overvoltage alarm signal. For example, if a high level indicates that an overvoltage fault occurs, the first overvoltage alarm signal is effective only when the first controller CPU 1 outputs a first overvoltage alarm signal of a high level. If the first overvoltage alarm signal output by the first controller CPU 1 is at a low level, the first overvoltage alarm signal is ineffective, that is, the first overvoltage alarm signal is not effectively output, and it is not considered that an overvoltage fault occurs. That the second controller CPU 2 outputs the second overvoltage alarm signal is similar to this.

On the contrary, if a low level indicates that an overvoltage fault occurs, the first overvoltage alarm signal is effective only when the first controller CPU 1 outputs a first overvoltage alarm signal of a low level. If the first overvoltage alarm signal output by the first controller CPU 1 is at a high level, the first overvoltage alarm signal is ineffective, that is, the first overvoltage alarm signal is not effectively output, and it is not considered that an overvoltage fault occurs. That the second controller CPU 2 outputs the second overvoltage alarm signal is similar to this.

That is, if the to-ground voltage of any one of the three direct current buses BUS+, BUS−, and M is greater than or equal to the preset threshold, it is determined that an overvoltage fault occurs. In this case, an alarm is required, and measures need to be taken to reduce the voltage below the preset threshold.

A voltage obtaining manner may not be limited in this embodiment. For example, the voltage may be obtained through a voltage sampling circuit, or through detection by using an integrated voltage sensor.

A value of the preset threshold is not limited in this embodiment. The preset threshold may be related to a voltage level of an input end of a single inverter.

Implementations of the first controller CPU 1 and the second controller CPU 2 are not limited in this embodiment, which may be a single-chip microcomputer, a microprocessor, a field-programmable gate array (FPGA), a digital signal processor (DSP), or the like.

The first controller CPU 1 and the second controller CPU 2 may need to work concurrently, so that when one of the controllers is faulty, the other controller can perform protection normally.

The bipolar photovoltaic system provided in this embodiment includes two controllers, that is, the first controller and the second controller. The first controller and the second controller simultaneously monitor the to-ground voltage of each of the three direct current buses BUS+, BUS−, and M. When the to-ground voltage of any direct current bus is greater than or equal to the preset threshold, the first controller and the second controller each output an overvoltage alarm signal. Redundancy control is implemented for the first controller and the second controller. If one of the controllers is faulty, overvoltage determining is not affected. In this case, the system takes corresponding measures to lower the voltage below the preset threshold, thereby ensuring security of the bipolar photovoltaic system. In other words, the voltage is lowered to a value meeting safety regulations and personal safety and equipment safety are ensured.

It should be noted that the first controller CPU 1 and the second controller CPU 2 are equally important when protecting the bipolar photovoltaic system.

The following describes a feasible implementation with reference to the accompanying drawing. The first controller and the second controller monitor a to-ground voltage of each of three direct current buses, and further need to monitor whether the other controller operates normally, and need to output a heartbeat alarm signal when an exception occurs.

Figure 4:
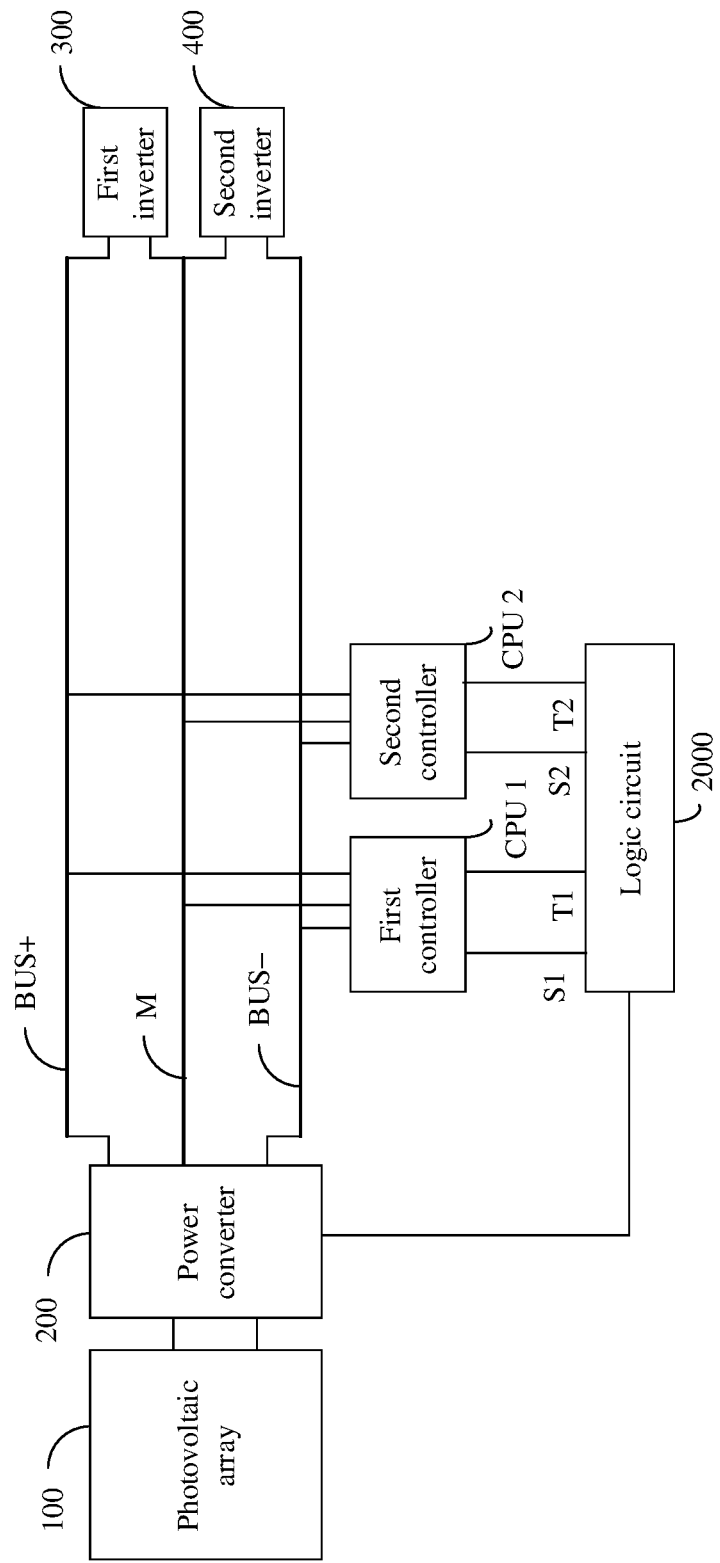
FIG. 4 is a schematic diagram of another bipolar photovoltaic system according to an embodiment.

FIG. 4 is a schematic diagram of another bipolar photovoltaic system according to an embodiment.

The first controller CPU 1 in the bipolar photovoltaic system provided in this embodiment is further configured to output a first heartbeat alarm signal T1 when the second controller CPU 2 is abnormal.

The second controller CPU 2 is further configured to output a second heartbeat alarm signal T2 when the first controller CPU 1 is abnormal.

During implementation, when the first controller CPU 1 receives no heartbeat signal sent by the second controller, the first controller CPU 1 outputs the first heartbeat alarm signal T1; and when the second controller CPU 2 receives no heartbeat signal sent by the first controller, the second controller CPU 2 outputs the second heartbeat alarm signal T2.

It should be noted that, outputting the first heartbeat alarm signal by the first controller CPU 1 means outputting an effective heartbeat alarm signal. For example, if a high level indicates that a heartbeat fault occurs, the first heartbeat alarm signal is effective only when the first controller CPU 1 outputs a first heartbeat alarm signal of a high level. If the first heartbeat alarm signal output by the first controller CPU 1 is at a low level, the first heartbeat alarm signal is ineffective, that is, the first heartbeat alarm signal is not effectively output, and it is not considered that a heartbeat fault occurs. That the second controller CPU 2 outputs the second heartbeat alarm signal is similar to this.

On the contrary, if a low level indicates that a heartbeat fault occurs, the first heartbeat alarm signal is effective only when the first controller CPU 1 outputs a first heartbeat alarm signal of a low level. If the first heartbeat alarm signal output by the first controller CPU 1 is at a high level, the first heartbeat alarm signal is ineffective, that is, the first heartbeat alarm signal is not effectively output, and it is not considered that a heartbeat fault occurs. That the second controller CPU 2 outputs the second heartbeat alarm signal is similar to this.

During normal operation, the second controller CPU 2 sends a heartbeat signal to the first controller CPU 1. When the first controller CPU 1 receives no heartbeat signal sent by the second controller CPU 2, the first controller CPU 1 determines that the second controller CPU 2 is abnormal, and outputs the first heartbeat alarm signal T1. In other words, the first heartbeat alarm signal T1 is used to indicate that the second controller CPU 2 is abnormal.

Similarly, the first controller CPU 1 sends a heartbeat signal to the second controller CPU 2. When the second controller CPU 2 receives no heartbeat signal sent by the first controller CPU 1, the second controller CPU 2 determines that the first controller CPU 1 is abnormal, and outputs the second heartbeat alarm signal T2. In other words, the second heartbeat alarm signal T2 is used to indicate that the first controller CPU1 is abnormal.

A representation form of the heartbeat signal may be a pulse signal. When the first controller CPU 1 receives no pulse signal sent by the second controller CPU 2, the first controller CPU 1 determines that the second controller CPU 2 is abnormal. Similarly, when the second controller CPU 2 receives no pulse signal sent by the first controller CPU 1, the second controller CPU 2 determines that the first controller CPU 1 is abnormal. In other words, when detecting that a pulse signal sent by the other side disappears, the first controller CPU 1 and the second controller CPU 2 each determine that the other side is abnormal and output the corresponding heartbeat alarm signal.

In addition, the bipolar photovoltaic system provided in this embodiment may further include a logic circuit 2000.

The first controller CPU 1 is connected to the logic circuit 2000, and the second controller CPU 2 is also connected to the logic circuit 2000.

The logic circuit 2000 is configured to block a driving pulse signal sent to the power converter 200 when at least one of the following alarm signals is received. The at least one alarm signal includes a first overvoltage alarm signal S1, a second overvoltage alarm signal S2, the first heartbeat alarm signal T1, or the second heartbeat alarm signal T2.

During normal operation, the logic circuit 2000 sends a driving pulse signal to each power transistor in the power converter 200, for example, may send a driving pulse signal to a gate of the power transistor, to control an on/off state of each power transistor, so that the power converter 200 completes voltage conversion. An implementation form of the power converter 200 is not limited in this embodiment. For example, the power converter 200 may include a boost circuit, and the boost circuit steps up an output voltage of the photovoltaic array 100 and provides the increased voltage to an input end of a post-stage inverter.

However, when the logic circuit 2000 receives any alarm signal, it is necessary to control the power converter 200 to stop operating and may block the driving pulse signal sent to the power converter 200. A possible implementation form is to set all driving pulse signals sent to the power converter 200 to a low level. In other words, when a to-ground voltage of any direct current bus is greater than or equal to a preset threshold, or when any controller is abnormal, the logic circuit 2000 blocks all the driving pulse signals sent to the power converter 200 to perform protection.

An implementation form of the logic circuit 2000 is not limited in this embodiment. For example, the logic circuit 2000 may be a complex programmable logic device (CPLD) or an FPGA.

The following provides description by using an example in which the logic circuit provided in this embodiment is a CPLD.

Figure 5:
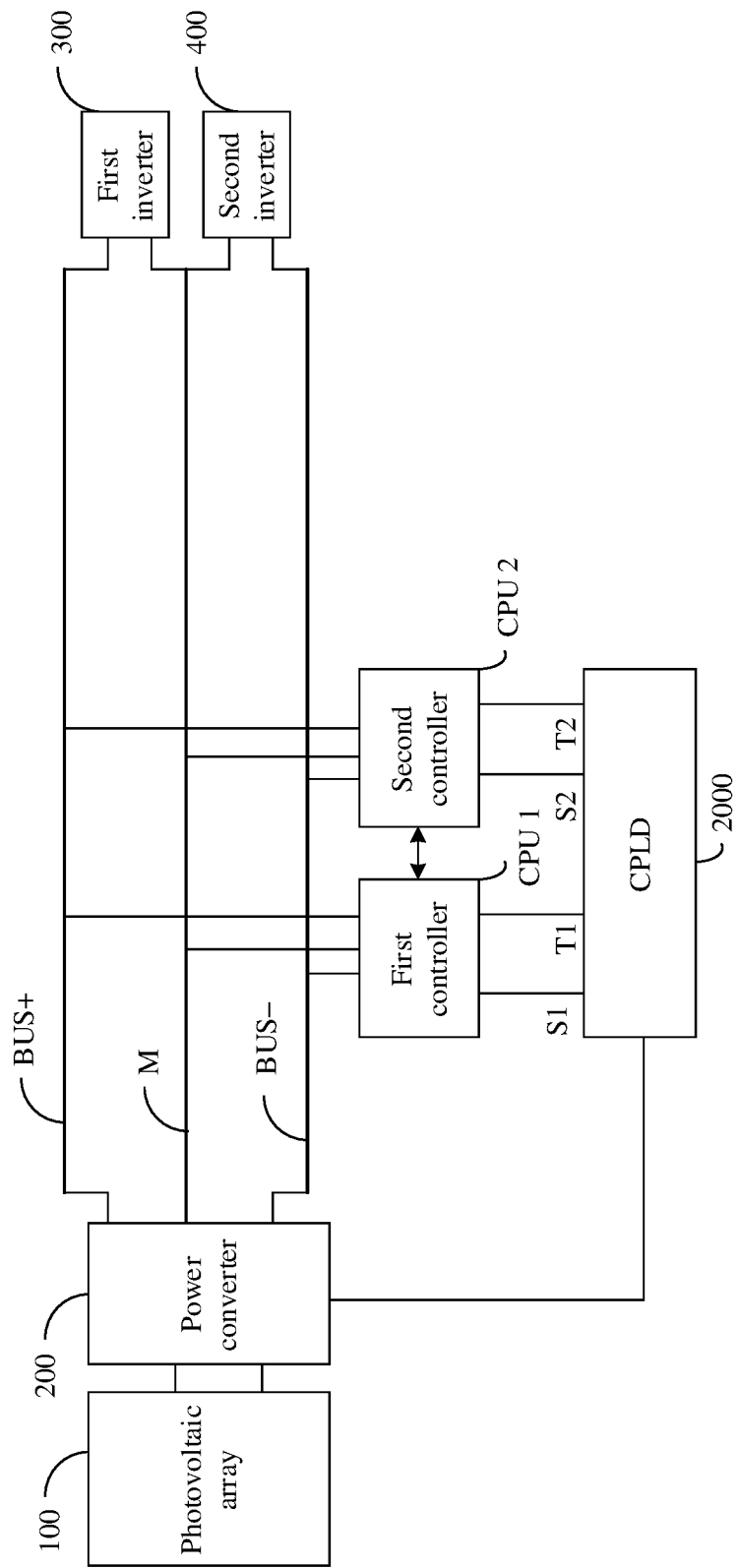
FIG. 5 is a schematic diagram of still another bipolar photovoltaic system according to an embodiment.

FIG. 5 is a schematic diagram of still another bipolar photovoltaic system according to an embodiment.

FIG. 5 differs from FIG. 4 in that a logic circuit in FIG. 5 is implemented by a CPLD.

Whether a logical operation of a CPLD 2000 is a logical OR operation or a logical AND operation is not limited in this embodiment.

The following describes two implementations separately.

Implementation 1: The logical operation is a logical OR operation.

The logical OR operation is suitable for a case that each alarm signal is effective when output at a high level. The CPLD 2000 may be configured to perform a logical OR operation on the first overvoltage alarm signal S1, the second overvoltage alarm signal S2, the first heartbeat alarm signal T1, and the second heartbeat alarm signal T2, that is, perform a logical OR operation on the four alarm signals. When a result of the logical OR operation is true, a driving pulse signal sent to the power converter 200 is blocked. For example, the high level corresponds to logic 1 and a low level corresponds to logic 0. If one alarm signal corresponds to logic 1, a result after logical OR is 1, and the CPLD 2000 blocks the driving pulse signal sent to the power converter 200. For example, an overvoltage fault occurs, the first overvoltage alarm signal S1 is 1, the second overvoltage alarm signal S2 is 1, and the two heartbeat signals are normal, that is, the first heartbeat alarm signal T1 is 0, and the second heartbeat alarm signal T2 is 0. In this case, a result of the logical OR operation performed by the CPLD 2000 is 1, and the driving pulse signal sent to the power converter 200 is blocked.

Implementation 2: The logical operation is a logical AND operation.

The logical AND operation is suitable for a case that each alarm signal is effective when output at a low level. The CPLD 2000 may be configured to perform a logical AND operation on the first overvoltage alarm signal S1, the second overvoltage alarm signal S2, the first heartbeat alarm signal T1, and the second heartbeat alarm signal T2, that is, perform a logical AND operation on the four alarm signals. When a result of the logical AND operation is false, a driving pulse signal sent to the power converter 200 is blocked. For example, the high level corresponds to logic 1 and the low level corresponds to logic 0. If one alarm signal corresponds to 0, a result after logical AND is 0, and the CPLD 2000 blocks the driving pulse signal sent to the power converter 200. For example, when the first controller CPU 1 detects that a largest value of absolute values is greater than a preset threshold, the first overvoltage alarm signal S1 is 0, the second overvoltage alarm signal S2 is 0, and the two heartbeat signals are normal, that is, the first heartbeat alarm signal T1 is 1, and the second heartbeat alarm signal T2 is 1. In this case, a result of the logical OR operation performed by the CPLD 2000 is 0, and the driving pulse signal sent to the power converter 200 is blocked.

For example, when the logical operation is a logical AND operation, when the first controller CPU 1 receives a heartbeat signal of the second controller CPU 2, the first heartbeat alarm signal T1 output by the first controller CPU 1 is at a high level; when the first controller CPU 1 receives no heartbeat signal of the second controller CPU 2, the first heartbeat alarm signal T1 output by the first controller CPU 1 is at a low level. That the second controller CPU 2 outputs the second heartbeat alarm signal T2 is similar to this, and details are not described herein again.

Because a low-level signal has stronger anti-interference capability than a high-level signal, to better implement redundancy protection, each alarm signal can use the low level as an effective signal, and the logic circuit uses the logical OR operation.

The following describes a manner of implementing overvoltage detection by the first controller.

In a possible implementation, during actual operation, a to-ground voltage of a direct current bus may be positive or negative. Therefore, the first controller needs to separately compare an absolute value of a to-ground voltage of each of the three direct current buses with the preset threshold. In other words, the first controller outputs the first overvoltage alarm signal when at least one of the absolute value of the to-ground voltage of the positive direct current bus, the absolute value of the to-ground voltage of the negative direct current bus, or the absolute value of the to-ground voltage of the neutral bus is greater than or equal to the preset threshold.

Another simple and practical implementation is that the first controller first obtains a largest value of absolute values of to-ground voltages of the three direct current buses and compares the largest value of the absolute values with the preset threshold. If the largest value of the absolute values is greater than or equal to the preset threshold, it indicates that an overvoltage fault occurs, and the first overvoltage alarm signal S1 is output. In other words, the first controller outputs the first overvoltage alarm signal S1 when a largest value of the absolute value of the to-ground voltage of the positive direct current bus, the absolute value of the to-ground voltage of the negative direct current bus, and the absolute value of the to-ground voltage of the neutral bus is greater than or equal to the preset threshold.

The following describes a manner of implementing overvoltage detection by the second controller.

In a possible implementation, during actual operation, a to-ground voltage of a direct current bus may be positive or negative. Therefore, the second controller needs to separately compare an absolute value of a to-ground voltage of each of the three direct current buses with the preset threshold. In other words, the second controller outputs the second overvoltage alarm signal S2 when at least one of the absolute value of the to-ground voltage of the positive direct current bus, the absolute value of the to-ground voltage of the negative direct current bus, or the absolute value of the to-ground voltage of the neutral bus is greater than or equal to the preset threshold.

Another simple and practical implementation is that the second controller first obtains a largest value of absolute values of to-ground voltages of the three direct current buses and compares the largest value of the absolute values with the preset threshold. If the largest value of the absolute values is greater than or equal to the preset threshold, it indicates that an overvoltage fault occurs, and the second overvoltage alarm signal S2 is output. In other words, the second controller outputs the second overvoltage alarm signal S2 when a largest value of the absolute value of the to-ground voltage of the positive direct current bus, the absolute value of the to-ground voltage of the negative direct current bus, and the absolute value of the to-ground voltage of the neutral bus is greater than or equal to the preset threshold.

During implementation, the to-ground voltages of the three direct current buses may be directly obtained. Alternatively, a voltage between the positive direct current bus and the neutral bus and the to-ground voltage of the neutral bus may be first obtained, and then the to-ground voltage of BUS+ is obtained based on the voltage between BUS+ and M and the to-ground voltage of M. The voltage between BUS+ and M is a half bus voltage, and similarly, a voltage between BUS− and M is also a half bus voltage. The half bus voltage may be a voltage that needs to be detected in the photovoltaic system. Therefore, this embodiment may utilize the half bus voltage, to obtain the to-ground voltage of BUS+, the to-ground voltage of BUS−, and the to-ground voltage of M. The following describes an implementation with reference to the accompanying drawing.

Figure 6:
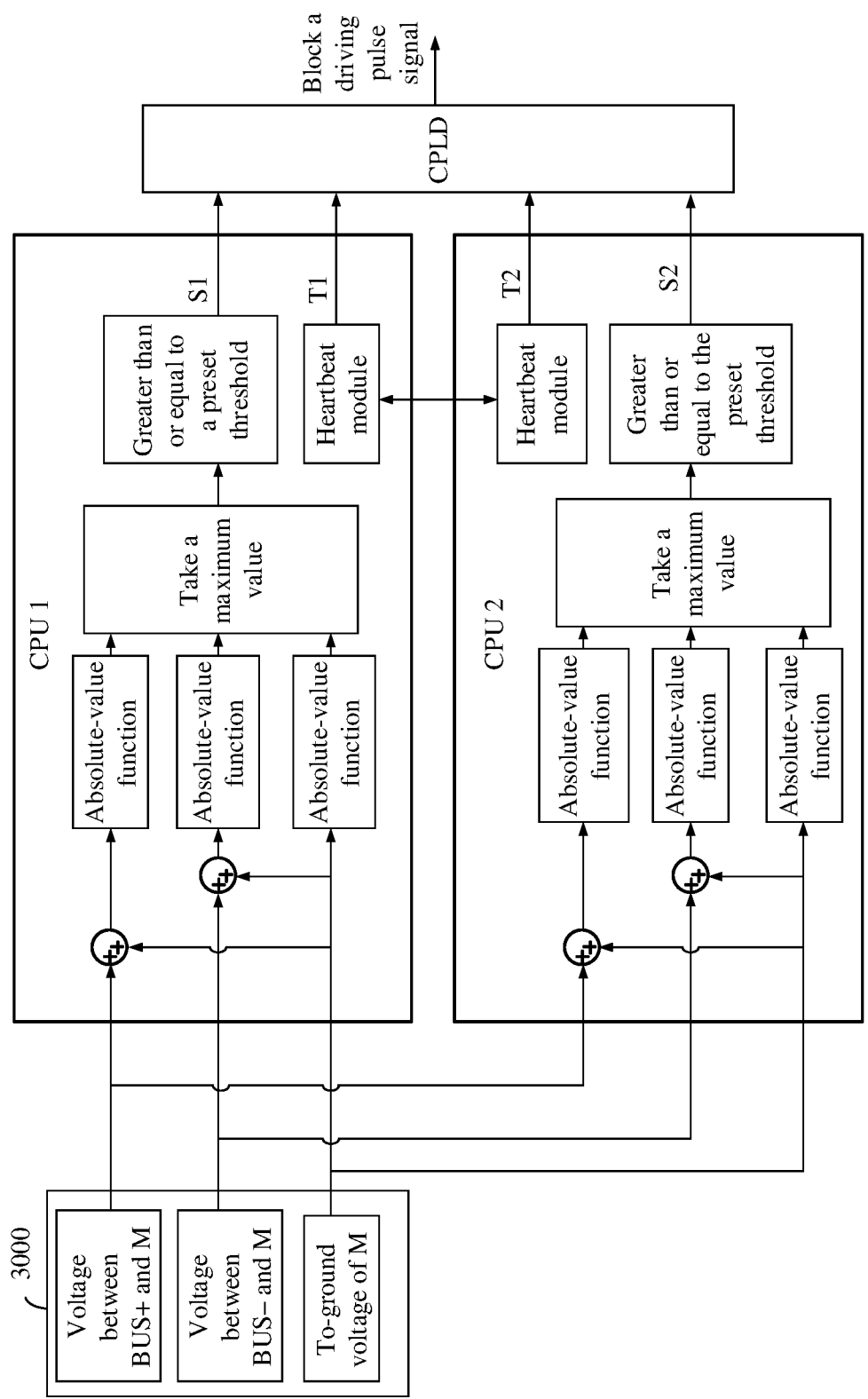
FIG. 6 is a schematic diagram of performing redundancy protection by using a largest value of absolute values according to an embodiment.

FIG. 6 is a schematic diagram of performing redundancy protection by using a largest value of absolute values according to an embodiment.

The bipolar photovoltaic system provided in this embodiment further includes a voltage sampling circuit 3000.

The voltage sampling circuit 3000 is configured to collect a voltage between a positive direct current bus and a neutral bus, a voltage between a negative direct current bus and the neutral bus, and a to-ground voltage of the neutral bus. It should be understood that collecting of the to-ground voltages of the three direct current buses may each correspond to one voltage sampling circuit or may share one voltage sampling circuit. This is not limited in this embodiment. The voltage sampling circuit sends the collected voltage between BUS+ and M, the to-ground voltage of BUS−, and the to-ground voltage of M to the first controller CPU 1 and the second controller CPU 2.

Both the first controller CPU 1 and the second controller CPU 2 may be configured to: obtain the to-ground voltage of the positive direct current bus BUS+ based on the voltage between the positive direct current bus BUS+ and the neutral bus M and the to-ground voltage of the neutral bus M; and obtain the to-ground voltage of the negative direct current bus BUS− based on a voltage between the negative direct current bus BUS− and the neutral bus M, and the to-ground voltage of the neutral bus M.

The to-ground voltage of BUS+ may be obtained by adding up the voltage between BUS+ and M and the to-ground voltage of M, and the to-ground voltage of BUS− may be obtained by adding up the voltage between BUS− and M and the to-ground voltage of M.

In addition, the first controller CPU 1 and the second controller CPU 2 may obtain an absolute value of the to-ground voltage of the positive direct current bus, an absolute value of the to-ground voltage of the negative direct current bus, and an absolute value of the to-ground voltage of the neutral bus by using an absolute-value function. The first controller CPU 1 and the second controller CPU 2 may obtain a largest value of the absolute value of the to-ground voltage of the positive direct current bus, the absolute value of the to-ground voltage of the negative direct current bus, and the absolute value of the to-ground voltage of the neutral bus by using a function of taking a maximum value. It should be understood that the largest value of the absolute values of to-ground voltages of the three direct current buses may be the to-ground voltage of any one of the direct current buses. For example, the absolute value of the to-ground voltage of BUS+ may be the largest, the absolute value of the to-ground voltage of M may be the largest, or the absolute value of the to-ground voltage of BUS− may be the largest. Therefore, it is not necessary to separately compare the absolute value of the to-ground voltage of each of the three buses with the preset threshold, but to compare the largest value of the three absolute values with the preset threshold, to more easily determine whether overvoltage occurs.

In addition, the first controller CPU 1 and the second controller CPU 2 each may compare the largest value of the absolute values with the preset threshold and output an overvoltage alarm signal when the largest value of the absolute values is greater than or equal to the preset threshold. In other words, when determining that the largest value of the absolute values is greater than or equal to the preset threshold, the first controller CPU 1 outputs the first overvoltage alarm signal S1. When determining that the largest value of the absolute values is greater than or equal to the preset threshold, the second controller CPU 2 outputs the second overvoltage alarm signal S2.

The first controller CPU 1 and the second controller CPU 2 each compare the largest value of the absolute values with the preset threshold, that is, determine the value only once, which is simple and convenient. There is no need to compare the to-ground voltage of each of the three direct current buses with the preset threshold.

For detecting a heartbeat of the other side by the first controller CPU 1 and the second controller CPU 2, each controller may include a heartbeat module. The heartbeat module is configured to: generate a heartbeat signal and send the generated heartbeat signal to the other side, so that the other side can monitor whether the heartbeat signal is normal; and when the heartbeat signal is abnormal, determine that an exception occurs. When detecting that the heartbeat signal of the other side disappears, the controller determines that the other side is abnormal and outputs a corresponding heartbeat alarm signal.

The CPLD 2000 blocks a driving pulse signal sent to the power converter 200 when receiving any effective alarm signal.

It can be understood from FIG. 6 that voltage signals input to the first controller CPU 1 and the second controller CPU 2 are the same, that is, the to-ground voltages of the three direct current buses are monitored. Therefore, redundancy protection for overvoltage can be implemented. In addition, the two controllers monitor heartbeat signals of each other, to monitor whether the other side can operate normally. When one controller is faulty, the other controller gives an alarm in a timely manner, so that the CPLD 2000 performs a protection action.

The bipolar photovoltaic system provided in above-described embodiments includes two controllers. The two controllers concurrently monitor whether the to-ground voltages of the three direct current buses are excessively high. When the to-ground voltage of any bus is excessively high, an alarm is given, and the logic circuit blocks a driving pulse signal sent to the power converter. Then the power converter stops operating, to prevent an excessively high output voltage of the power converter from affecting a post-stage inverter, thereby avoiding impact on a load. Because the two controllers operate concurrently, redundancy can be implemented for the two controllers, ensuring full and effective identification of an overvoltage fault and providing protection. In addition, the two controllers may further monitor heartbeat signals of each other and give an alarm when the heartbeat signal of one controller disappears. In this case, the logic circuit also blocks the driving pulse signal sent to the power converter, to stop the power converter from operating and protect the bipolar photovoltaic system.

In actual application, alternating currents output by the first inverter 300 and the second inverter 400 may be connected to an alternating current power grid by using two independent isolation transformers or a multi-winding transformer. The following separately provides description with reference to accompanying drawings.

Figure 7:
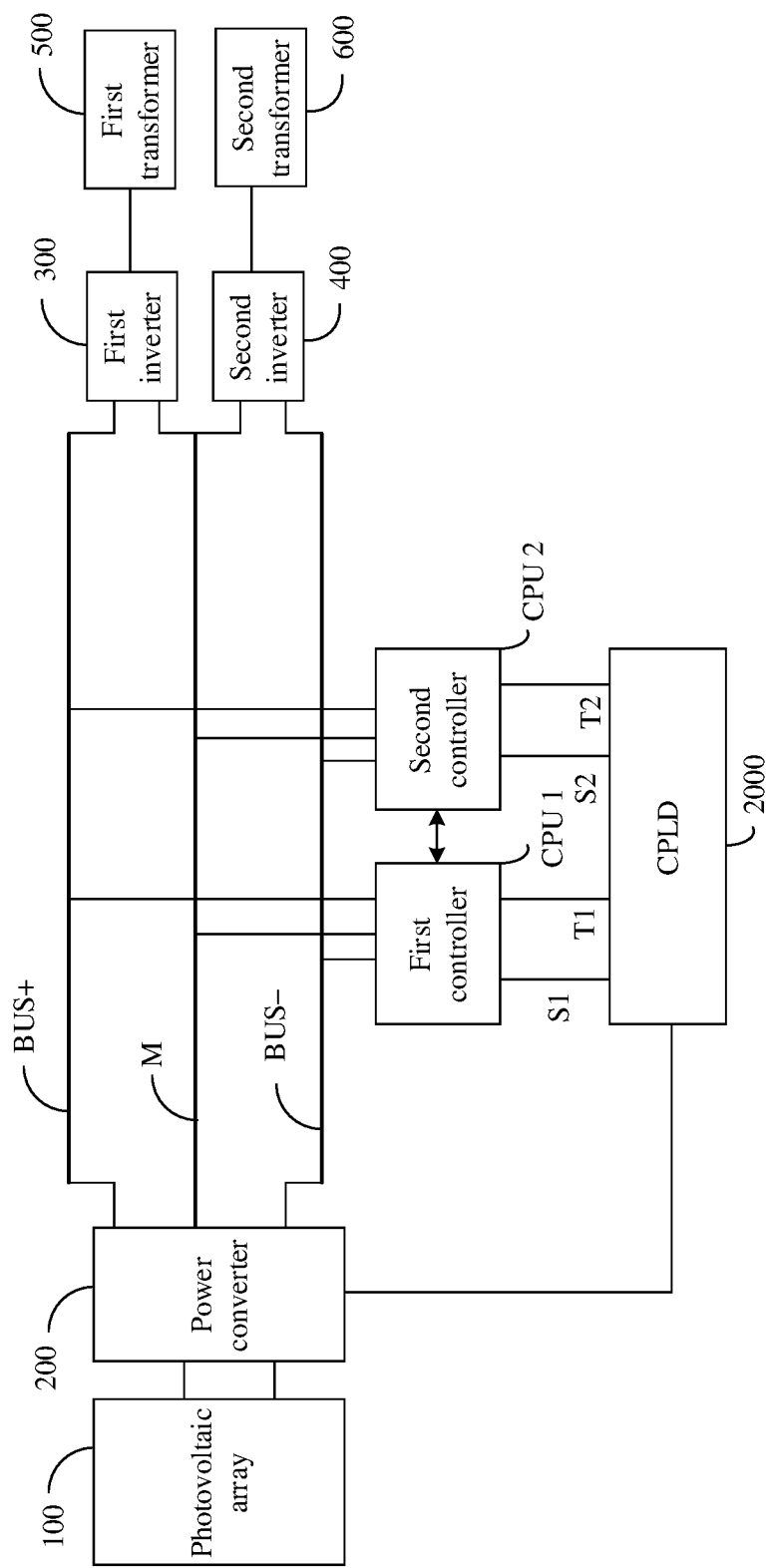
FIG. 7 is a schematic diagram of yet another bipolar photovoltaic system according to an embodiment.

FIG. 7 is a schematic diagram of yet another bipolar photovoltaic system according to an embodiment.

In FIG. 7, an output end of the first inverter 300 is connected to a first transformer 500, that is, the first inverter 300 is connected to a power grid through the first transformer 500.

An output end of the second inverter 400 is connected to a second transformer 600, that is, the second inverter 400 is connected to the power grid through the second transformer 600.

The first transformer 500 and the second transformer 600 may be configured to implement electrical isolation and may also implement voltage transformation at the same time.

In addition, to save space and reduce costs, the first inverter 300 and the second inverter 400 may share a same transformer, that is, a multi-winding transformer.

Figure 8:
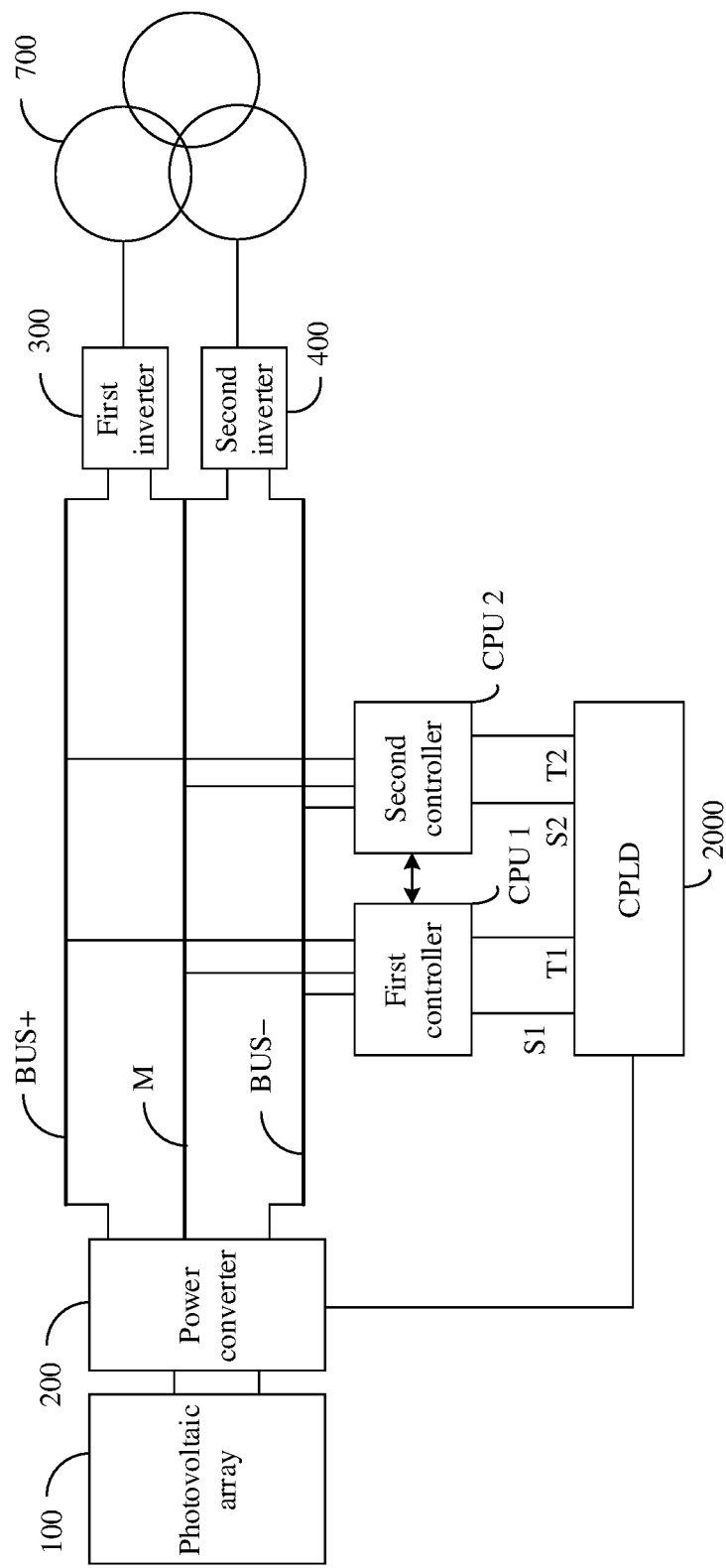
FIG. 8 is a schematic diagram of still yet another bipolar photovoltaic system according to an embodiment.

FIG. 8 is a schematic diagram of still yet another bipolar photovoltaic system according to an embodiment.

In FIG. 8, output ends of the first inverter 300 and the second inverter 400 are both connected to a multi-winding transformer 700, where the output end of the first inverter 300 is connected to a first primary-side winding of the multi-winding transformer 700, the output end of the second inverter 400 is connected to a second primary-side winding of the multi-winding transformer 700, and a secondary-side winding of the multi-winding transformer 700 is connected to the power grid. In other words, the first inverter 300 and the second inverter 400 are connected to two different primary-side windings of the multi-winding transformer 700, and the two different primary-side windings share a same secondary-side winding.

Embodiment of a Power Supply System

The foregoing embodiments describe an implementation solution in which a bipolar power supply system is applied to the field of photovoltaic power generation. The redundancy protection solution provided in embodiments is not only applicable to a bipolar photovoltaic system, but also applicable to a bipolar system for wind power generation and may also be applicable to a bipolar system for energy storage. The following separately provides description with reference to accompanying drawings.

Figure 9:
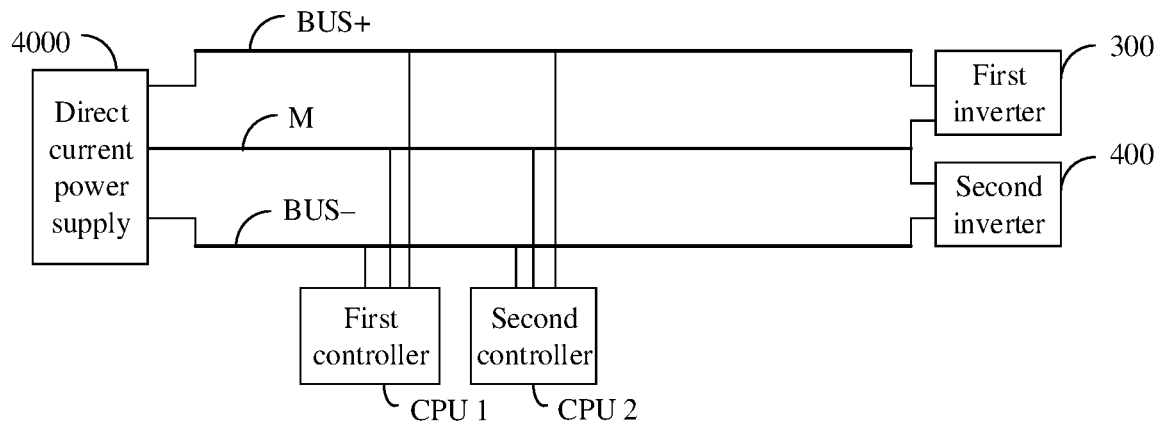
FIG. 9 is a schematic diagram of a structure of a power supply system according to an embodiment.

FIG. 9 is a schematic diagram of a photovoltaic system according to an embodiment.

The power supply system provided in this embodiment includes three direct current buses: BUS+, M, and BUS−, and further includes two inverters and two controllers.

A first end of the positive direct current bus BUS+ is configured to connect to a first output end of a direct current power supply 4000, a first end of the neutral bus is configured to connect to a second output end of the direct current power supply 4000, and a first end of the negative direct current bus BUS− is configured to connect to a third output end of the direct current power supply 4000.

A first input end of the first inverter 300 is connected to a second end of the positive direct current bus BUS+, and a second input end of the first inverter 300 is connected to a second end of the neutral bus M.

A first input end of the second inverter 400 is connected to a second end of the neutral bus M, and a second input end of the second inverter 400 is connected to a second end of the negative direct current bus BUS−.

The first controller CPU 1 is configured to output a first overvoltage alarm signal when at least one of the following conditions is met;
the second controller CPU 2 is configured to output a second overvoltage alarm signal when at least one of the following conditions is met; and
the at least one condition includes: a to-ground voltage of the positive direct current bus BUS+ is greater than or equal to a preset threshold, a to-ground voltage of the negative direct current bus BUS− is greater than or equal to the preset threshold, or a to-ground voltage of the neutral bus M is greater than or equal to the preset threshold.

The bipolar photovoltaic system provided in this embodiment includes two controllers, that is, the first controller and the second controller. The first controller and the second controller simultaneously monitor the to-ground voltage of each of the three direct current buses BUS+, BUS−, and M. When the to-ground voltage of any direct current bus is greater than or equal to the preset threshold, the first controller and the second controller each output an overvoltage alarm signal. Redundancy control is implemented for the first controller and the second controller. If one of the controllers is faulty, overvoltage determining is not affected. In this case, the system takes corresponding measures to lower the voltage below the preset threshold, thereby ensuring security of the bipolar photovoltaic system. In other words, the voltage is lowered to a value meeting safety regulations and personal safety and equipment safety are ensured.

The bipolar power supply system provided in this embodiment may reduce a voltage borne by a power device, facilitating selection of the device. During actual operation, a distance between the power converter and a post-stage inverter may be relatively long. Therefore, a loss on a power cable corresponding to the direct current bus is relatively large. Therefore, the loss needs to be maximally reduced to improve power generation efficiency. Because the direct current buses include three buses and correspond to two inverters, and a voltage corresponding to each inverter is half of a total voltage of the direct current buses, that is, a half bus voltage, the borne voltage can be reduced. However, the system does not reduce the total voltage of the buses. For example, the total voltage remains 3000 V. A higher total voltage of the direct current buses indicates a smaller corresponding current, and a smaller current indicates a lower corresponding loss. Therefore, power consumption on the direct current bus can be reduced.

The bipolar power supply system provided in this embodiment may not only be applied to the field of photovoltaic power generation, that is, a direct current power source is obtained from any one of photovoltaic power generation, wind power generation, or an energy storage battery; but also applied to the field of wind power generation. For example, a direct current power source connected to the power converter may be obtained from a fan 800.

Figure 10:
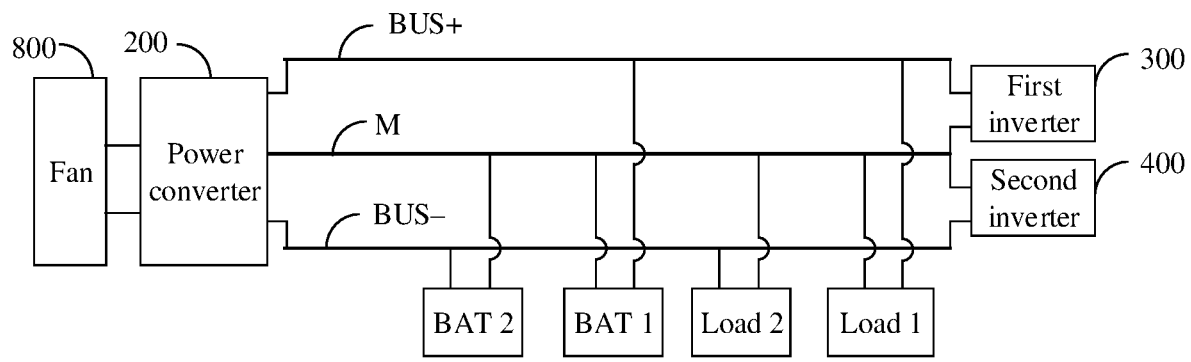
FIG. 10 is a schematic diagram of a bipolar power supply system in the wind turbine field according to an embodiment.

FIG. 10 is a schematic diagram of a bipolar power supply system in the wind turbine field according to an embodiment.

A direct current output by the fan 800 is converted by the power converter 200 and then output to the three direct current buses: BUS+, M, and BUS−. It should be understood that if a power conversion circuit is connected to the fan 800, the power converter 200 in the system may be removed as an unnecessary device. If electricity generated by the fan 800 needs to be connected to the power grid, output ends of the first inverter 300 and the second inverter 400 may be connected to the power grid through a transformer. For implementation of the transformer, refer to two implementations corresponding to FIG. 7 and FIG. 8. Details are not described herein again.

Figure 11:
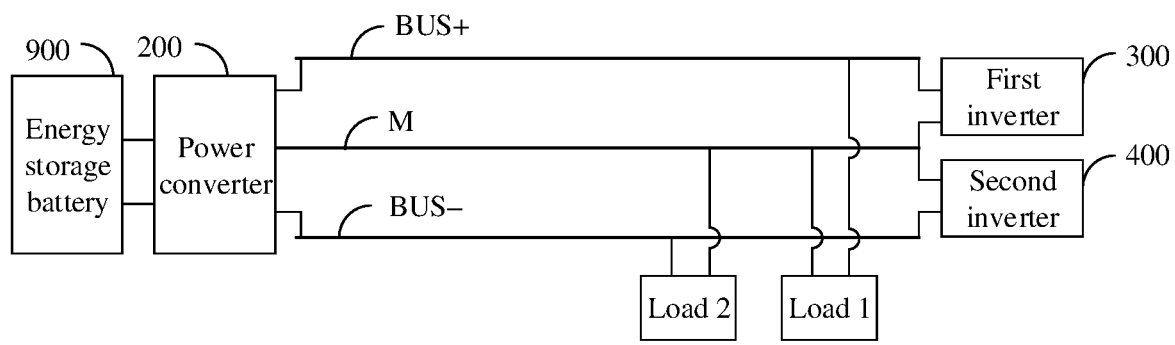
FIG. 11 is a schematic diagram of a bipolar power supply system in the energy storage field according to an embodiment.

FIG. 11 is a schematic diagram of a bipolar power supply system in the energy storage field according to an embodiment.

A direct current output by an energy storage battery 900 is converted by the power converter 200 and then output to the three direct current buses: BUS+, M, and BUS−. If the direct current output by the energy storage battery 900 needs to be connected to the power grid, the power converter 200 is first required to perform voltage transformation on the output direct current. For example, the power converter 200 includes a boost circuit, which steps up an output voltage of the energy storage battery 900 and outputs the voltage. The first inverter 300 is configured to convert a direct current between BUS+ and M into an alternating current, and the second inverter 400 is configured to convert a direct current between M and BUS-into an alternating current. The output ends of the first inverter 300 and the second inverter 400 may be connected to the power grid through a transformer. For implementation of the transformer, refer to two implementations corresponding to FIG. 7 and FIG. 8. Details are not described herein again.

Regardless of the fan, photovoltaic, or the energy storage battery, the power supply system provided in this embodiment can implement redundancy protection, including redundancy protection for overvoltage and redundancy protection for the two controllers. The following briefly describes redundancy protection of the power supply system shown in FIG. 10 and FIG. 11. For a detailed process, refer to the description of the embodiment of the photovoltaic system.

The first controller is further configured to output a first heartbeat alarm signal when detecting that the second controller is abnormal.

The second controller is further configured to output a second heartbeat alarm signal when detecting that the first controller is abnormal.

The first controller may be configured to: when receiving no heartbeat signal sent by the second controller, detect that the second controller is abnormal.

The second controller may be configured to: when receiving no heartbeat signal sent by the first controller, detect that the first controller is abnormal.

The first controller may be configured to output a first overvoltage alarm signal when a largest value of an absolute value of the to-ground voltage of the positive direct current bus, an absolute value of the to-ground voltage of the negative direct current bus, and an absolute value of the to-ground voltage of the neutral bus is greater than or equal to the preset threshold.

The second controller may be configured to output a second overvoltage alarm signal when at least one of the absolute value of the to-ground voltage of the positive direct current bus, the absolute value of the to-ground voltage of the negative direct current bus, or the absolute value of the to-ground voltage of the neutral bus is greater than or equal to the preset threshold.

A logic circuit connected to the first controller and the second controller is further included. The logic circuit is configured to block a driving pulse signal sent to the power converter when at least one of the following alarm signals is received, where the at least one alarm signal includes the first overvoltage alarm signal, the second overvoltage alarm signal, the first heartbeat alarm signal, or the second heartbeat alarm signal.

It should be noted that, the power converter, the first inverter, and the second inverter described in the foregoing embodiments may all implement bidirectional operating. In other words, energy may be transferred from the power converter to the inverter, and energy may be transferred from the inverter to the power converter. For example, for an energy storage system, the energy storage battery may be charged by using electric energy of the power grid.

Embodiment of a Protection Method

Based on the bipolar photovoltaic system provided in above-described embodiments, an embodiment further provides a protection method for a bipolar photovoltaic system. The following provides detailed description with reference to accompanying drawings.

Figure 12:
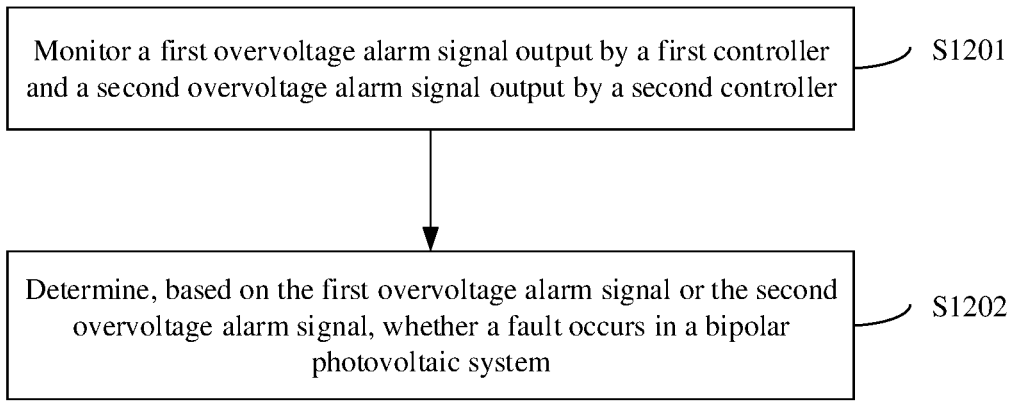
FIG. 12 is a flowchart of a protection method for a bipolar photovoltaic system according to an embodiment.

FIG. 12 is a flowchart of a protection method for a bipolar photovoltaic system according to an embodiment.

In the protection method for the bipolar photovoltaic system provided in this embodiment, the bipolar photovoltaic system includes: a first input end of a first inverter is connected to a second end of a positive direct current bus, and a second input end of the first inverter is connected to a second end of a neutral bus; a first input end of a second inverter is connected to the second end of the neutral bus, and a second input end of the second inverter is connected to a second end of a negative direct current bus. For a schematic diagram of the bipolar photovoltaic system, refer to accompanying drawings corresponding to the foregoing system embodiments. Details are not described herein again.

S1201: Monitor a first overvoltage alarm signal output by a first controller and a second overvoltage alarm signal output by a second controller.

The first controller outputs the first overvoltage alarm signal when at least one of the following conditions is met; the second controller outputs the second overvoltage alarm signal when at least one of the following conditions is met; and the at least one condition includes: a to-ground voltage of the positive direct current bus is greater than or equal to a preset threshold, a to-ground voltage of the negative direct current bus is greater than or equal to the preset threshold, or a to-ground voltage of the neutral bus is greater than or equal to the preset threshold.

It should be understood that, when the to-ground voltage of any direct current bus is excessively high, the first overvoltage alarm signal output by the first controller is effective. This has been described in the embodiment of the photovoltaic system, and details are not described herein again. Similarly, the second overvoltage alarm signal output by the second controller is also effective. When the output signal is ineffective, it indicates that no overvoltage occurs.

S1202: Determine, based on the first overvoltage alarm signal or the second overvoltage alarm signal, whether a fault occurs in the bipolar photovoltaic system.

When an overvoltage fault occurs, a driving pulse signal sent to the power converter may be blocked, that is, transmission of electric energy from the power converter to the inverter is stopped, and the power converter stops operating, to protect a post-stage electrical device, for example, the inverter and a load.

In the protection method for the bipolar photovoltaic system provided in this embodiment, the two controllers simultaneously monitor to-ground voltages of three direct current buses, that is, simultaneously monitor the to-ground voltages of the three direct current buses: BUS+, BUS−, and M. When the to-ground voltage of any direct current bus is greater than or equal to the preset threshold, the first controller and the second controller each output an overvoltage alarm signal. If one of the controllers is faulty, overvoltage determining is not affected, thereby implementing redundancy protection. In this case, the system takes corresponding measures to lower the voltage below the preset threshold, thereby ensuring security of the bipolar photovoltaic system. In other words, the voltage is lowered to a value meeting safety regulations and personal safety and equipment safety are ensured.

In addition, according to the protection method provided in this embodiment, the two controllers may further monitor heartbeat signals of each other, to determine whether the other side operates normally. The following provides detailed description with reference to accompanying drawings. The method in this embodiment may be performed in a logic circuit, for example, a CPLD, an FPGA, or another device, or may be performed in a processor. This is not limited in this embodiment.

Figure 13:
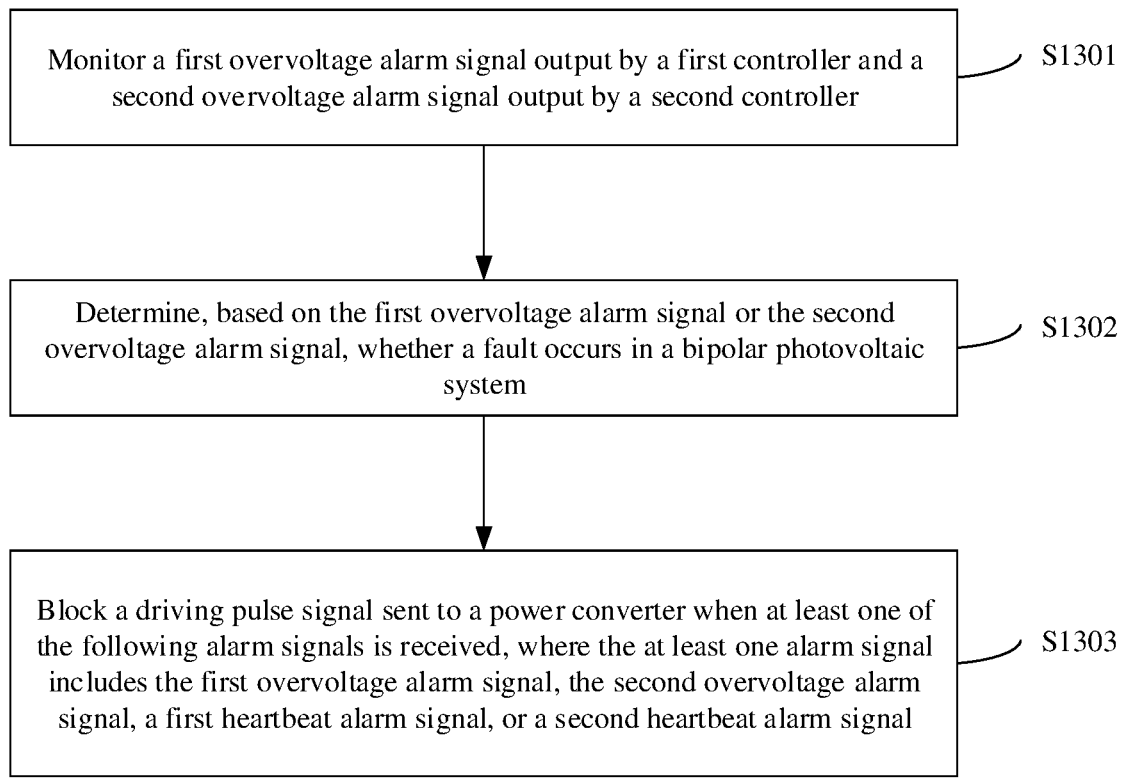
FIG. 13 is a flowchart of another protection method for a bipolar photovoltaic system according to an embodiment.

FIG. 13 is a flowchart of another protection method for a bipolar photovoltaic system according to an embodiment.

S1301: Receive a first overvoltage alarm signal and a first heartbeat signal that are sent by a first controller.

S1302: Receive a second overvoltage alarm signal and a second heartbeat signal that are sent by a second controller.

It should be understood that, there is no sequence between S1301 and S1302. In addition, there is also no sequence between the first overvoltage alarm signal and the first heartbeat signal, and the first overvoltage alarm signal and the first heartbeat signal may or may not coexist. For example, to-ground voltages of three direct current buses are all normal, but a heartbeat of one controller is abnormal. This is not limited in this embodiment.

When the first controller outputs a first heartbeat alarm signal or the second controller outputs a second heartbeat alarm signal, it is determined that a fault occurs in the bipolar photovoltaic system. The first controller outputs the first heartbeat alarm signal when the second controller is abnormal. The second controller outputs the second heartbeat alarm signal when the first controller is abnormal.

S1303: Block a driving pulse signal sent to a power converter when at least one of the following alarm signals is received, where the at least one alarm signal includes the first overvoltage alarm signal, the second overvoltage alarm signal, the first heartbeat alarm signal, or the second heartbeat alarm signal.

Whether the alarm signal is effective is related to a preset indication of a high level or a low level. For example, the high level indicates that the alarm signal is effective. In this case, when a high-level alarm signal is received, it indicates that an effective alarm signal is received. For example, if a high-level voltage alarm signal is received, it indicates that an overvoltage fault occurs. If a high-level heartbeat alarm signal is received, it indicates that one of the controllers is abnormal. If an ineffective alarm signal is received, it may be equivalent to that no alarm signal is received. For example, when the high level indicates effective, if a low-level signal is received, it is equivalent to that no alarm signal is received.

That the first controller outputs the first overvoltage alarm signal when the to-ground voltage of the positive direct current bus is greater than or equal to the preset threshold, the to-ground voltage of the negative direct current bus is greater than or equal to the preset threshold, or the to-ground voltage of the neutral bus is greater than or equal to the preset threshold may include:

obtaining a largest value of an absolute value of the to-ground voltage of the positive direct current bus, an absolute value of the to-ground voltage of the negative direct current bus, and an absolute value of the to-ground voltage of the neutral bus; and outputting the first overvoltage alarm signal when the largest value is greater than or equal to the preset threshold.

That the second controller outputs the second overvoltage alarm signal when the to-ground voltage of the positive direct current bus is greater than or equal to the preset threshold, the to-ground voltage of the negative direct current bus is greater than or equal to the preset threshold, or the to-ground voltage of the neutral bus is greater than or equal to the preset threshold may include:

obtaining the largest value of the absolute value of the to-ground voltage of the positive direct current bus, the absolute value of the to-ground voltage of the negative direct current bus, and the absolute value of the to-ground voltage of the neutral bus; and outputting the second overvoltage alarm signal when the largest value is greater than or equal to the preset threshold.

In the protection method provided in this embodiment, the two controllers may further monitor heartbeat signals of each other and give an alarm when the heartbeat signal of one controller disappears. A logic circuit further blocks a driving pulse signal sent to the power converter, to stop the power converter from operating, thereby protecting the bipolar photovoltaic system.

It should be understood that, "at least one" means one or more, and "a plurality of" means two or more. The term "and/or" is used to describe an association relationship for describing associated objects and indicates that three relationships may exist. For example, "A and/or B" may represent the following three cases: only A exists, only B exists, and both A and B exist, where A and B may be singular or plural. The character "/" may represent an "or" relationship between the associated objects. "At least one of the following items" or a similar expression thereof means any combination of these items, including any combination of a single item or a plurality of items. For example, at least one of a, b, and c may represent a, b, c, "a and b", "a and c", "b and c", or "a, b, and c", where a, b, and c may be singular or plural.

The foregoing embodiments are merely intended for describing embodiments but are not intended as limiting. Although described in detail with reference to the foregoing embodiments, persons of ordinary skill in the art should understand that they may still make modifications without departing from the spirit and scope of the embodiments.

What is claimed is:

1. A photovoltaic system comprising:
 a power converter, wherein an input end of the power converter is configured to connect to a photovoltaic array, a first output end of the power converter is connected to a first end of a positive direct current bus, a second output end of the power converter is connected to a first end of a neutral bus, and a third output end of the power converter is connected to a first end of a negative direct current bus;
 a first inverter, wherein a first input end of the first inverter is connected to a second end of the positive direct current bus, and a second input end of the first inverter is connected to a second end of the neutral bus;

a second inverter, wherein a first input end of the second inverter is connected to a second end of the neutral bus, and a second input end of the second inverter is connected to a second end of the negative direct current bus;

a first controller, wherein the first controller is configured to output a first overvoltage alarm signal when at least one of the following conditions is met; and a second controller, wherein the second controller is configured to output a second overvoltage alarm signal when at least one of the following conditions is met; and the at least one condition comprises:

a to-ground voltage of the positive direct current bus is greater than or equal to a preset threshold, a to-ground voltage of the negative direct current bus is greater than or equal to the preset threshold, or a to-ground voltage of the neutral bus is greater than or equal to the preset threshold;

wherein the first controller is further configured to output a first heartbeat alarm signal when the second controller is abnormal; and the second controller is further configured to output a second heartbeat alarm signal when the first controller is abnormal;

a logic circuit connected to the first controller and the second controller, wherein the logic circuit is configured to block a driving pulse signal sent to the power converter when at least one of the following alarm signals is received; and the at least one alarm signal comprises the first overvoltage alarm signal, the second overvoltage alarm signal, the first heartbeat alarm signal, or the second heartbeat alarm signal.

2. The photovoltaic system according to claim 1, wherein the first controller is further configured to output the first heartbeat alarm signal when receiving no heartbeat signal sent by the second controller; and the second controller is further configured to output the second heartbeat alarm signal when receiving no heartbeat signal sent by the first controller.

3. The photovoltaic system according to claim 1, wherein the logic circuit is a complex programmable logic device CPLD; and the CPLD is further configured to:

perform a logical OR operation on the first overvoltage alarm signal, the second overvoltage alarm signal, the first heartbeat alarm signal, and the second heartbeat alarm signal; and when a result of the logical OR operation is true, block the driving pulse signal sent to the power converter.

4. The photovoltaic system according to claim 1, wherein the logic circuit is a complex programmable logic device CPLD; and the CPLD is further configured to:

perform a logical AND operation on the first overvoltage alarm signal, the second overvoltage alarm signal, the first heartbeat alarm signal, and the second heartbeat alarm signal; and when a result of the logical AND operation is false, block the driving pulse signal sent to the power converter.

5. The photovoltaic system according to claim 1, wherein the first controller is further configured to:

compare each of an absolute value of the to-ground voltage of the positive direct current bus, an absolute value of the to-ground voltage of the negative direct current bus, and an absolute value of the to-ground voltage of the neutral bus with the preset threshold; and output the first overvoltage alarm signal when at least one of the absolute value of the to-ground voltage of the positive direct current bus, the absolute value of the to-ground voltage of the negative direct current bus, or the absolute value of the to-ground voltage of the neutral bus is greater than or equal to the preset threshold.

6. The photovoltaic system according to claim 1, wherein the first controller is further configured to:

obtain a largest value of an absolute value of the to-ground voltage of the positive direct current bus, an absolute value of the to-ground voltage of the negative direct current bus, and an absolute value of the to-ground voltage of the neutral bus; and output the first overvoltage alarm signal when the largest value is greater than or equal to the preset threshold.

7. The photovoltaic system according to claim 1, wherein the second controller is further configured to:

compare each of an absolute value of the to-ground voltage of the positive direct current bus, an absolute value of the to-ground voltage of the negative direct current bus, and an absolute value of the to-ground voltage of the neutral bus with the preset threshold; and output the second overvoltage alarm signal when at least one of the absolute value of the to-ground voltage of the positive direct current bus, the absolute value of the to-ground voltage of the negative direct current bus, or the absolute value of the to-ground voltage of the neutral bus is greater than or equal to the preset threshold.

8. The photovoltaic system according to claim 1, wherein the second controller is further configured to:

obtain a largest value of an absolute value of the to-ground voltage of the positive direct current bus, an absolute value of the to-ground voltage of the negative direct current bus, and an absolute value of the to-ground voltage of the neutral bus; and output the second overvoltage alarm signal when the largest value is greater than or equal to the preset threshold.

9. The photovoltaic system according to claim 1, further comprising:

a voltage sampling circuit, wherein the voltage sampling circuit is configured to collect a voltage between the positive direct current bus and the neutral bus, a voltage between the negative direct current bus and the neutral bus, and a to-ground voltage of the neutral bus; and both the first controller and the second controller are further configured to:

obtain the to-ground voltage of the positive direct current bus based on the voltage between the positive direct current bus and the neutral bus and the to-ground voltage of the neutral bus; and obtain the to-ground voltage of the negative direct current bus based on the voltage between the negative direct current bus and the neutral bus, and the to-ground voltage of the neutral bus.

10. A power supply system, comprising: a first inverter, a second inverter, a first controller, and a second controller, wherein a first end of a positive direct current bus is configured to connect to a first output end of a direct current power supply, a first end of a neutral bus is configured to connect to a second output end of the direct current power supply, and a first end of a negative direct current bus is configured to connect to a third output end of the direct current power supply;

a first input end of the first inverter is connected to a second end of the positive direct current bus, and a second input end of the first inverter is connected to a second end of the neutral bus;

a first input end of the second inverter is connected to a second end of the neutral bus, and a second input end of the second inverter is connected to a second end of the negative direct current bus;

the first controller is configured to output a first overvoltage alarm signal when at least one of the following conditions is met;

the second controller is configured to output a second overvoltage alarm signal when at least one of the following conditions is met; and the at least one condition comprises: a to-ground voltage of the positive direct current bus is greater than or equal to a preset threshold, a to-ground voltage of the negative direct current bus is greater than or equal to the preset threshold, or a to-ground voltage of the neutral bus is greater than or equal to the preset threshold;

wherein the first controller is further configured to output a first heartbeat alarm signal when detecting that the second controller is abnormal; and the second controller is further configured to output a second heartbeat alarm signal when detecting that the first controller is abnormal;

a logic circuit connected to the first controller and the second controller, wherein the logic circuit is configured to block a driving pulse signal sent to the power converter when at least one of the following alarm signals is received; and the at least one alarm signal comprises the first overvoltage alarm signal, the second overvoltage alarm signal, the first heartbeat alarm signal, or the second heartbeat alarm signal.

11. The power supply system according to claim 10, wherein the direct current power source is obtained from any one of photovoltaic power generation, wind power generation, or an energy storage battery.

12. The power supply system according to claim 10, wherein the first controller is further configured to:
when receiving no heartbeat signal sent by the second controller, detect that the second controller is abnormal; and
the second controller is further configured to:
when receiving no heartbeat signal sent by the first controller, detect that the first controller is abnormal.

13. The power supply system according to claim 10, wherein the first controller is further configured to:
obtain a largest value of an absolute value of the to-ground voltage of the positive direct current bus, an absolute value of the to-ground voltage of the negative direct current bus, and an absolute value of the to-ground voltage of the neutral bus; and
output the first overvoltage alarm signal when the largest value is greater than or equal to the preset threshold; and
the second controller is further configured to:
obtain the largest value of the absolute value of the to-ground voltage of the positive direct current bus, the absolute value of the to-ground voltage of the negative direct current bus, and the absolute value of the to-ground voltage of the neutral bus; and
output the second overvoltage alarm signal when the largest value is greater than or equal to the preset threshold.

14. The power supply system according to claim 10, wherein the first controller is further configured to:
compare each of an absolute value of the to-ground voltage of the positive direct current bus, an absolute value of the to-ground voltage of the negative direct current bus, and an absolute value of the to-ground voltage of the neutral bus with the preset threshold; and
output the first overvoltage alarm signal when at least one of the absolute value of the to-ground voltage of the positive direct current bus, the absolute value of the to-ground voltage of the negative direct current bus, or the absolute value of the to-ground voltage of the neutral bus is greater than or equal to the preset threshold; and
the second controller is further configured to:
compare each of an absolute value of the to-ground voltage of the positive direct current bus, an absolute value of the to-ground voltage of the negative direct current bus, and an absolute value of the to-ground voltage of the neutral bus with the preset threshold; and
output the second overvoltage alarm signal when at least one of the absolute value of the to-ground voltage of the positive direct current bus, the absolute value of the to-ground voltage of the negative direct current bus, or the absolute value of the to-ground voltage of the neutral bus is greater than or equal to the preset threshold.

15. A protection method for a bipolar photovoltaic system, wherein the bipolar photovoltaic system comprises: a first input end of a first inverter is connected to a second end of a positive direct current bus, and a second input end of the first inverter is connected to a second end of a neutral bus; a first input end of a second inverter is connected to the second end of the neutral bus, and a second input end of the second inverter is connected to a second end of a negative direct current bus;
monitoring a first overvoltage alarm signal output by a first controller and a second overvoltage alarm signal output by a second controller;
determining, based on the first overvoltage alarm signal or the second overvoltage alarm signal, whether a fault occurs in the bipolar photovoltaic system; and
outputting, by the first controller, the first overvoltage alarm signal when at least one of the following conditions is met; and outputting, by the second controller, the second overvoltage alarm signal when at least one of the following conditions is met, wherein the at least one condition comprises: a to-ground voltage of the positive direct current bus is greater than or equal to a preset threshold, a to-ground voltage of the negative direct current bus is greater than or equal to the preset threshold, or a to-ground voltage of the neutral bus is greater than or equal to the preset threshold;
outputting, by the first controller, a first heartbeat alarm signal when the second controller is abnormal; and
outputting, by the second controller, a second heartbeat alarm signal when the first controller is abnormal;
blocking a driving pulse signal sent to the power converter when at least one of the following alarm signals is received, wherein
the at least one alarm signal comprises the first overvoltage alarm signal, the second overvoltage alarm signal, the first heartbeat alarm signal, or the second heartbeat alarm signal.

* * * * *